United States Patent
Gallizzi et al.

(10) Patent No.: US 9,908,047 B2
(45) Date of Patent: Mar. 6, 2018

(54) USER SAVE DATA MIGRATION BASED ON LOCATION INFORMATION

(71) Applicant: Sony Interactive Entertainment America LLC, San Mateo, CA (US)

(72) Inventors: Ulrich Gallizzi, Aliso Viejo, CA (US); Ryan Hamilton Breed, Laguna Niguel, CA (US); Victor Vlasie, Redwood City, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 104 days.

(21) Appl. No.: 15/138,121

(22) Filed: Apr. 25, 2016

(65) Prior Publication Data

US 2017/0304727 A1 Oct. 26, 2017

(51) Int. Cl.

| A63F 13/00 | (2014.01) |
|---|---|
| A63F 13/49 | (2014.01) |
| A63F 13/216 | (2014.01) |
| A63F 13/493 | (2014.01) |
| A63F 13/352 | (2014.01) |

(52) U.S. Cl.
CPC ............ *A63F 13/49* (2014.09); *A63F 13/216* (2014.09); *A63F 13/352* (2014.09); *A63F 13/493* (2014.09)

(58) Field of Classification Search
CPC ............ G07F 17/3225; G07F 17/3227; G07F 17/3237; G07F 17/3239
See application file for complete search history.

(56) References Cited

U.S. PATENT DOCUMENTS

| 2013/0238795 A1* | 9/2013 | Geffin .................... G06F 1/206 709/224 |
|---|---|---|
| 2015/0089604 A1 | 3/2015 | Mathew et al. |
| 2016/0088066 A1 | 3/2016 | Thomas et al. |
| 2016/0323377 A1* | 11/2016 | Einkauf .............. H04L 67/1076 |

OTHER PUBLICATIONS

ISR PCT/US2017/028582, dated Jun. 28, 2017, 3 pages.

* cited by examiner

*Primary Examiner* — James S McClellan
(74) *Attorney, Agent, or Firm* — Martine Penilla Group, LLP

(57) ABSTRACT

Methods and systems for assigning a data center in a second geo location for migrating data in anticipation of receiving a request from a user account from the second geo location includes receiving an indication of a change in geo location of a user from a first geo location to the second geo location. Save data for the user is identified at the first geo location. The save data is analyzed to determine usage trend of the user for the plurality of games. A portion of the save data is identified, based on the usage trend, and transmitted to a second data center in the second geo location in anticipation of the user's likely access of the save data at the second geo location. The save data is made available to game logic of one or more games, when executed on a cloud gaming system, so as to provide current state of game play of the respective one or more games for rendering on a client device of the user used to access the game.

29 Claims, 8 Drawing Sheets

USER SAVE DATA MIGRATION BASED ON LOCATION INFORMATION

CROSS REFERENCE TO RELATED APPLICATION

This application is related to U.S. patent application Ser. No. 14/805,419, filed on Jul. 21, 2015, and entitled "Save Game Load Time Reduction for Cloud Gaming," which is incorporated herein by reference in its entirety.

BACKGROUND

Field

The present disclosure relates to systems and methods for providing games for user interaction, and more specifically to fast access to the game for cloud gaming.

Description of the Related Art

One of the rapidly growing technologies is in the field of cloud gaming. Users are able to access a number of games on a cloud gaming site over a network, such as the Internet, and begin interaction/playing the game. A user accesses his/her account on the cloud gaming site and selects a game from a list of games that are available for the user account, for game play. When the user selects a game for viewing and/or game play, the user will have to wait till the cloud gaming site identifies a data center that is closest to the user on which to load the game code for the selected game. Upon loading of the game code, the user is provided access to the game for game play. The data center is identified by conducting a pre-test of the user's connections against several data centers to determine which data center provides the optimal connection speed for the user's game play. The pre-testing step causes additional wait for the user, which may lead to the user losing interest in the game. Further, when the user travels to a new geo location and wishes to continue his game play at the cloud gaming site, the cloud gaming site may have to determine the new geo location, identify a second data center that is closest to the user's new geo location, perform the pre-test, load the game code for game play before providing the user access to the game for game play at the new geo location. Thus, every time the user goes to a new location, the user has to wait for game data to load, leading to user's frustration.

Further, the data center in the new geo location will not have the current state of the game play as the current state of the game play is located in the first data center that is used to service the user's game play requests. This would result in the user being forced to start the game from the beginning at the new geo location, adding to additional frustration for the user as he has to waste time in recreating his game play. The user's frustration can be detrimental to the game developer as the additional wait and lack of current game data may lead to the user losing interest in the game and stopping interactions with the game site, resulting in a potential loss to the game developer/game site owner.

It is within this context that embodiments of the invention arise.

SUMMARY OF THE INVENTION

Embodiments of the present invention disclose methods and systems that are used for providing access to current game state of a game hosted by a cloud hosting system, to allow instant game play of the game from any geo location. The cloud hosting system is configured to host a plurality of online games for game play using resources available to the cloud hosting system, and is therefore also referred to herein as a "cloud gaming system". Generally, when a user accesses the cloud gaming system and requests to play a game, the cloud gaming system determines a geo location of the user. The cloud gaming system identifies a data center that is in the vicinity of the geo location from where the user initiated the access request, and verifies to see if the data center is capable (i.e., includes processing and communication resources) of servicing the user's request. The cloud gaming system sends a signal to the identified data center to service the request of the user. In response, a server at the data center in the geo location provides the game data for game play. User interactions are used to drive the game play. The game related data from the user's game play is maintained at the data center as save data and is provided to the user every time the user accesses the game for game play. The save data provides a current state of the game, so as to enable the user to continue game play of the game from where the user left off in the previous game session. The current state of the game includes current game level, current status of the game including game winnings, trophies, game points, game currencies, weapons, freebies, awards, rewards, point scores, game lives, etc., game customizations, available game play options, game metrics, game clips, mini-games created from the game play, historical communication with other users, game recordings, and any other components that are required to re-create or mirror the current game state of the game from a user's prior game play session. The current state of the game allows the user to continue the game play from where he left off in the user's prior game play session.

In some embodiments, when a user travels to a second geo location, the cloud gaming system detects a change in the geo location of the user. In response to the detected change in the geo location, the cloud gaming system analyzes historical game play data of the user to determine usage trend related to the one or more games. Based on the usage trend, a portion of save data of the user related to the game play of the one or more games is identified and transmitted to a new data center in the vicinity of the second geo location. The transmission of the save data is performed before a user selects one or more of the games for game play from the second geo location. The save data is transmitted in anticipation that the user will access the one or more games for game play from the second geo location, based on the usage trend of the user. The transmitted save data provides current game state for the one or more games, to allow the user to continue his game play from second geo location.

Predicting the user's game play preferences and proactively providing the save data for the relevant games at a data center near the new geo location (i.e., second geo location) enables a user to have faster access to the relevant games without considerable wait. The save data allows the user to continue his game play of the relevant games, saving the user a considerable amount of time, as the user does not have to go about recreating the game play. Further, assigning a data center in the vicinity of the new geo location of the user allows for efficient exchange of streaming game play data between the client device and the server executing the game play, minimizing the latency for rendering the game play data at the client device. The change in the data center for servicing the user's game play request is transparent to the user. Identification and migration of the relevant save data of a user allows the hosting system to mirror the game play state of the user at a data center in any geo location.

When identifying the data center in the new geo location, the cloud gaming system performs pre-test to ensure that the identified data center has sufficient resources, including game code of the relevant games, to provide a comparable game play experience for the user. The cloud gaming system also ensures that the connection attributes of a communication connection defined between the identified data center and the user's client device, when the user accesses the game from the cloud gaming system, has the capability to perform in accordance to the connection requirements and processing resources expected for servicing the game play request.

The connection attributes and processing resources required for the user to play a game may be determined by the cloud gaming system by analyzing the historical game play data that is maintained for the user account of the user and the requirements specified by a game developer. The historical game play data may include such data as intensity of the game played by the user, game levels played, stream quality from previous streaming game play sessions, graphic intensity of the game scenes, etc. The cloud gaming system loads the relevant save data of the user related to one or more games, at the data center identified in the second geo location that has the processing resources and the connection attributes required to service the user's game play requests. The user's save data is loaded to the data center in anticipation that the user will access the one or more games from the second geo location.

In one embodiment, after allocating the data center at the second geo location, the cloud gaming system may periodically perform a quality-of-service test, during the user's current gaming session, to ensure that the assigned data center continues to provide the required processing resources and the connection speed for the user's current game play. In one embodiment, the quality-of-service test may be performed by continuously monitoring the data transmissions between the client device used for game play and the assigned data center at the second geo location to ensure that the assigned data center in the second geo location provides the necessary processing, network resources and connection speed for providing a comparable game play that the user experienced in the first geo location. The assignment of data center in the second geo location is made possible by leveraging on the usage trend information available in the historical game play data of the user.

In one embodiment, a method is provided. The method includes receiving an indication of a change in a geo location of a user from a first geo location to a second geo location. Save data of the user stored in a data center associated with the first geo location, is identified. The save data includes data related to game play of one or more games by the user, which is collected over time. The save data of the user is analyzed to determine usage trend in relation to the one or more games, by the user. The usage trend is determined from game metrics captured during game play of the one or more games by the user. A portion of save data that is to be made available to the user for subsequent game play of the one or more games, is determined based on the usage trend. The portion of save data is transmitted to a second data center in a vicinity of the second geo location, prior to the user accessing the one or more games from the second geo location. The transmission of the save data is performed in anticipation of the user's likely access of the one or more games at the second geo location, based on the usage trend of the user. The save data transmitted to the second data center is made available to game logic of the one or more games. The save data is used to render a current state of game play of the respective ones of the games, to enable the user to resume his game play through his user account.

In another embodiment, a cloud gaming system is disclosed. The cloud gaming system includes an application server that is configured to execute a plurality of games hosted by the cloud gaming system and to service requests to access particular ones of the plurality of games for user interaction, wherein the requests are originated from a user account of a user. The application server includes a data center manager and a save data migration manager. The data center manager is configured to receive an indication of a change in geo location of a user from a first geo location to a second geo location, analyze use history of the user for the plurality of games to determine user profile of the user and usage trend of the user in relation to the plurality of games, identify a new data center in a vicinity of the second geo location based on processing requirements and communication connection requirements for the one or more games defined from the usage trend. The save data migration manager is configured to identify save data of the user, determine a portion of the identified save data of the user that is related to particular ones of the plurality of games, based on usage trend of the user, and generate a signal to a data center in the first geo location to migrate the portion of the save data of the user corresponding to the particular ones of the plurality of games, to the new data center in the second geo location, prior to the user accessing any one of the particular ones of the plurality of games from the second geo location. The data center in the first geo location was used to service the user's prior request for accessing particular ones of the plurality of games and the migration of the save data to the new data center is performed in anticipation of the user's likely access of the save data at the second geo location, as defined by the usage trend of the user. The transmitted save data is made available to the user to provide a current state of the particular ones of the plurality of games during game play. The application server is configured to detect selection of one of the particular ones of the plurality of games and, in response, automatically retrieve the save data corresponding to the selected game available in the second data center and transmit to a client device for rendering on a user interface of the client device. The retrieved save data renders a current state of the selected game.

In some embodiments, the application server of the cloud gaming system is configured to receive geo location data from a client device and verify to determine a change in the geo location of the user.

In some embodiments, the cloud gaming system includes one or more social media application programming interface (API) to make API calls to one or more social media system and obtain information from social media feed of the user. The cloud gaming system is configured to contextually analyze the information to obtain geo location data and verify the geo location data to determine a change in the geo location of the user.

In some embodiments, the portion of the save data to be transmitted to the data center in the second geo location is determined based on a type of game or the usage trend of the user.

In some embodiments, the save data migration manager is further configured to retrieve changes to the save data resulting from the user interactions with the particular ones of the plurality of games at the new data center in the second geo location and transmit the changes to the data center in the first geo location for updating the save data of the user.

The updated save data provides current state of the particular ones of the plurality of games for the user at the first geo location.

In some embodiments, the cloud gaming system further includes a quality-of-service engine that is configured to verify connection attributes of a communication connection between a client device and the new data center in the second geo location and to generate a signal to the data center manager to switch the new data center, when the connection attributes do not meet connection requirements for servicing user interaction requests from the user for the particular ones of the plurality of games.

In another embodiment, a client device is disclosed. The client device includes a processor for executing one or more client-side applications. The client-side applications are configured to interact over a network with corresponding server-side applications hosted by one or more servers of an application hosting system. The client-side applications are used to provide user interactions for updating the server-side applications. A client-side processing module in the client device is configured to provide access to games hosted by a cloud gaming system. The client-side processing module is configured to collect geo location information from user interactions at one or more of the client-side applications; interpret the geo location information to generate geo tags; automatically transmit the geo tags to a server of the cloud gaming system when the geo tags indicate a change in geo location of a user from a first geo location to a second geo location. The change in the geo location of the user triggers identification and migration of a portion of save data for the user corresponding to one or more games from a first data center in the first geo location to a second data center in the second geo location. The identification and migration is performed in response to detecting change in the geo location and prior to the user's selection of one or more games hosted by the cloud gaming system, from the second geo location. The client-side applications are also configured to receive streaming game data for a select one of the games, in response to detecting the user's selection of the game via the client device, from the second geo location. The game data is formatted and streamed to the client device for rendering on a display screen of the client device, in response to the user's selection of the game. The game data presents current state of the game.

In some embodiments, the client-side processing module includes a threshold analysis module that is configured to perform predefined number of verifications to confirm change in the geo location of the user from the first geo location to the second geo location, prior to transmitting the geo tags to the server. The verification is performed by analyzing user interactions with additional one or more of the client-side applications to identify geo location information and interpreting the geo location information gathered from the user interactions to determine if the gathered geo location information corresponds to the second geo location.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

Figure 1:
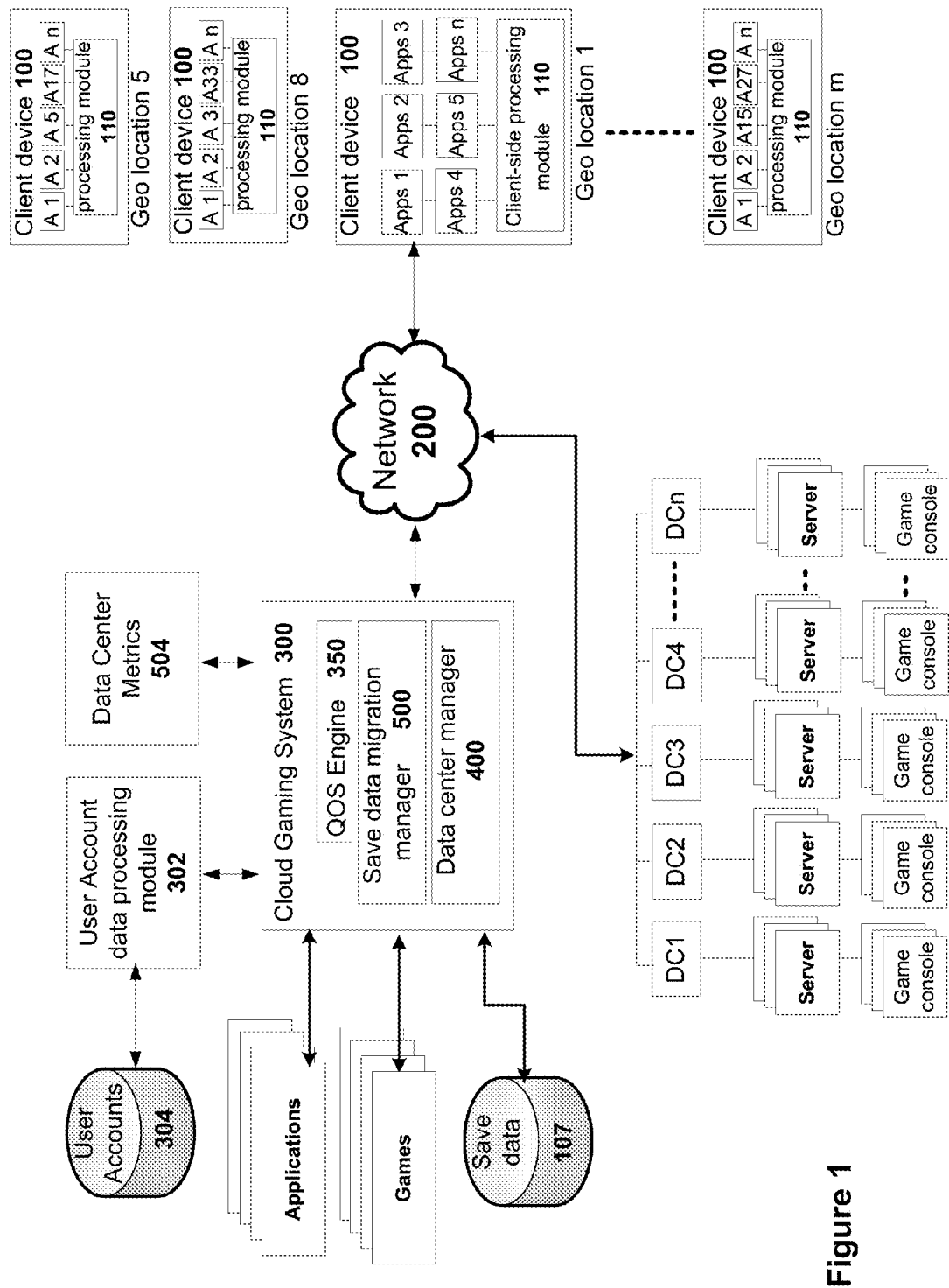
FIG. 1 illustrates a simplified block diagram of an example system that is used to detect change in geo location of a user in order to migrate save data of the user to a data center at a second geo location, in accordance with an embodiment of the present invention.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

According to an embodiment of the present invention a user may access a cloud gaming system for selecting a game for game play, through a user account at the cloud gaming system. In response to the user's selection, a gaming history of the user maintained in the cloud gaming system or on a local server, a remote server or anywhere else on the cloud, and accessed through an application server of the cloud gaming system, is analyzed to determine a user profile of the user in relation to game play. The user profile provides an insight into the user's game play history that can be used to determine usage trend of the user in relation to the one or more games. For example, the user profile of the user may be used to identify the user's preference of games for different game play periods, including day of the week, time of day, etc. Additionally, the user's profile may also be used to identify type of game play desired by the user or most commonly played by the user, intensity of game play preferred by the user, expertise level of the user, expected performance use of the games including graphics of the selected game, display preference, game level preference, geo location of user when the game request is initiated, etc.

Information provided in the user profile is used by the cloud gaming system to identify a data center in the vicinity of the geo location of the user that is capable of providing the processing and communication resources required for game play of the game. The identified data center is assigned to the user to service the user's game play requests. The assignment causes a server of the identified data center to automatically establish a communication connection with a client device of the user that is used to initiate the game play request. After assignment, the connection attributes of the connection between the computing device and the server of the identified data center are verified during game play by conducting quality-of-service tests to determine if the connection attributes continue to meet connection requirements expected for servicing the game play request from the user.

In some embodiments, the data center may be assigned based on geo location and/or time characteristics identified in the user profile of the user. In some other embodiments, the data center may be assigned based on connection attributes of connections between a data center and the client devices of other users in the geo location of the user whose game play requests for the same game were serviced by the data center. The connection attributes may be used to determine the type of connection required for servicing the user's game play request of the game. Generally, users that are local to a particular geo location are served by the same internet service provider (ISP) and/or will all have similar connection attributes for a particular game, for example. The time-local (current or recent) streaming data from these users that share the same ISP and/or the geo location of the user initiating the request, may be used to predict connection attributes for servicing the request of the user. In such embodiments, if sufficient connection attribute data from other users in the same ISP/geo location are available, the same data center within the geo location that was assigned to the other users may also be assigned to service the game play request of the user. Such assignment may be done without requiring additional quality-of-service connection test to be performed, after allocation of the data center, as the connection attributes have shown to be satisfactory for the other users based on their continued game play. This would result in considerable savings in the processing resources and time that would otherwise have been expended in the verification of connection attributes for servicing the request from the user.

As mentioned earlier, the user's profile identifies the geo location of the user. When the user travels out of the geo location to a different geo location, the cloud gaming system detects a change in the geo location. The cloud gaming system may receive indication of a change in geo location of the user directly from a signal generated by a client device of the user, may be deduced by interpreting user interaction signals generated from the client device by the user, or both. In response to the change in the geo location, the application server at the cloud gaming system identifies a second data center in a vicinity of the changed geo location, and proceeds to send a signal instructing the original data center in a first geo location that was assigned to service the game play requests for a game from the user, to migrate the relevant game play data for the game to the second data center at the changed geo location. The relevant game play data for the game may include game-related data and user-related data. The game-related data may include game code and game attributes for generating an instance of the game. The user-related data may be in the form of save data that includes game play data. The save data provides sufficient information to re-create a game state of the game, so as to allow the user to continue playing the game from the point where the user left off in a previous game play session. In some embodiments, the signal may be generated after the application server verifies that the changed geo location is indeed where the user is currently located.

The application server then assigns the second data center to service the requests of the user. In response to the assignment, the second data center automatically establishes a communication connection between itself and the client device to enable game play of the game for which the save data was migrated to the second data center. In some embodiments, the save data includes user-related game data for more than one game that the user normally selects for game play.

After assigning the new data center to the user, a quality of service (QoS) engine within the application server performs QoS tests to ensure that the new data center is servicing the user's request to the satisfaction of the user. The QoS tests may be carried out periodically or continuously during the game play session of the user. The QoS tests performed at the new data center are similar to the tests performed when an initial data center was assigned to the user at a first geo location. As part of the QoS tests, the processing resources of the data center are monitored to ensure that sufficient resources have been assigned for servicing the user's game play request. In some embodiments, the processing resources provided at the newly assigned data center at the second geo location may exceed the performance requirements necessary for servicing the request or may exceed the performance use of the user. In such embodiments, the processing resources allocated within the server may be adjusted to allow efficient servicing of the request while making optimal use of the processing and communication resources of the newly assigned data center.

Similarly, connections attributes of the communication connection between the client device and the second data center are monitored to ensure that the newly assigned data center is servicing the user's game play request at a level that is comparable to what was provided by the first data center. The connection attributes may include one or more of connection speed of the communication connection established between the client device of the user and the server of the new data center that was assigned to service the request of the user, proximity of the new data center to the user, etc. The monitoring of the communication connection may be performed using the streaming data packets exchanged between the client device and the new data center during the current game play. If the connection attributes of the connection meet the expected connection requirements, the newly assigned data center is used to continue servicing the request from the user at the second geo location. If the connection attributes fall short of the expected connection requirements, then the newly assigned data center may be switched to another data center within the second geo location so as to provide optimal gaming experience for the user. The switching may be done during game play, during a pause in game play, or at any other transition point defined for the game. The switching is carried out by migrating the save data of the user that includes the current state of the game to a different data center identified within the second geo location.

User's game play at the newly assigned data center is used to update the save data of the user at the newly assigned data center with game play information so as to provide current game state of the game. Additionally, the changes in the save data, as a result of the user interaction provided during game play, are identified and transmitted to the first data center for updating the save data of the user maintained at the first data center. In some embodiments, the transmission of the save data updates to the first data center may be carried out after conclusion of each game play or each game play session at the second geo location. In an alternate embodiment, the save data updates may be transmitted after the system detects a further change in the geo location of the user from the second geo location back to the first geo location. In another embodiment, the save data updates may be transmitted after the system detects that the user has not initiated game play requests from the second geo location for a predefined period of time (e.g., a day, a week, etc.). The lack of additional game play requests at the second geo location may indicate that the user is no longer in the second geo location.

The game play at the second data center is used to update the user profile of the user and the data center profile of the second data center. The user metrics of the user is used to provide the game use history of the user. The data center metrics of the second data center may be used to provide the use history and current status of the resources.

Each data center is associated with a data center profile that may be maintained in a data center history within the cloud gaming system. The data center profile identifies the connection attributes that are available, connection attributes that were used when requests were received from a plurality of users and serviced by the respective data centers within the cloud gaming system. As each data center may service a plurality of users' requests at any given time, the data center profile of the respective data center is being dynamically updated as and when user requests are being serviced. The data center profile of the data centers within the cloud gaming system and the gaming-related user profile of all the users provide a rich source of historical information that can be used to intelligently predict where the user's subsequent request would come from and route the user's request to appropriate data center within a current geo location of the user, so as to allow the user to have an enriching game playing experience. For example, when assigning the data center to the user at the new geo location, the data center profile of the data center may be examined to determine if the data center has sufficient resources to service the request of the user. Such determination may be made based on usage trend of the user initiating the request and the current data center profile of the one or more data centers that is identified for assigning to the request. The usage trend may identify the user as an expert in a type of game that is recognized as a high-impact and graphic intensive game. In such a case, information provided in the data center profile is used to ensure that the identified data center has sufficient resources and that the connection attributes of the connection between the data center and the client device is able to meet the connection requirements for streaming the graphics of such a game, to avoid any latency during transmission of the game play data.

According to the traditional method, when a user request was received, the user request was examined to determine the game selected for game play and a game type. Then, a client device's connection to different data centers in a geo location of the user was tested using test data to identify a data center that would provide the resources and communication connection for servicing the request of the user. Upon determining that a data center in the geo location of the user provided the necessary resources (i.e., communication and processing resources), the data center was assigned to service the user's request. This pre-testing before allocating/assigning the data center resulted in the user having to wait before the user is provided access to the resources for playing the game. As the game becomes more graphic and/or performance intensive and requires more resources, the pre-testing may become more involved leading to more wait. Additionally, when the game logic is executed at the assigned data center, the current state of the game may not be provided to the user, thereby forcing the user to start from the beginning of the game to recreate the game play. This is waste of user's time, which can lead to the user losing interest in the game. Alternately, the user may be directed to his original data center that was assigned to the user during the user's earlier game play sessions. This may not be an optimal solution as the distance of the data center may result in significant latency during game data transmission, leading to the user having a poor game play experience and hence, losing interest in the game and stop interacting with the game site. The unsatisfactory game play experiences of the user directly translate to loss in potential revenue to the game developer/game site owner.

The various embodiments described herein allow a user to have a satisfactory game play experience by making sure that the user does not have to recreate the game play from start or unnecessarily wait for game data to be made available to the user. The embodiments allow a cloud gaming system to intelligently predict the user's current geo location using various signals generated by the user at the client device, and predict when the user would access the various games in the future. The cloud gaming system predicts the user's access of various games by analyzing the user's game play history provided in the user's profile to identify the usage trend of the user for the various games. Based on the past usage trend, the cloud gaming system may intelligently predict when the user would subsequently access the various games. Based on the prediction and the knowledge of the current geo location, the cloud gaming system identifies and proactively migrates at least a portion of the save data of the user corresponding to one or more games, to a data center that is identified for the current geo location, in anticipation that the user will access the one or more games for game play during a time period the user is in the current geo location. The data center for the current geo location is selected to service the user's request, so as to provide optimal connection quality, network routes and network resource characteristics to allow the user to have satisfactory game play experience. When the user actually accesses a game for game play at the current geo location, the relevant save data of the user that was migrated to the data center is retrieved for the game so as to allow the game logic of the game to use the save data to render a current state of the game. This allows the user to continue his game play from a point where he left off in his previous game play session of the game, without any delay, thereby enhancing the user's game play experience.

When the data center identified is the same data center that serviced the user's previous game play requests of the game, the data center simply presents the current game state of the game from the previous game play session. In this case, there is no need for migrating the save data of the user as it is already readily available at the data center.

In some cases, even after detecting a change in the geo location of the user, the cloud gaming system may not move the save data of the user to a new geo location if the cloud gaming system determines that the migration is not necessary. For example, the cloud gaming system may detect the new geo location of the user, analyze the usage trend of the user for the one or more games that the user typically plays, determine that the user does not usually access the games from the new geo location or during that period the user is in the new geo location, and may end up not moving the save data of the user to a data center in the new geo location. This allows the system to avoid unnecessary transmission of the save data when use of such save data by the user at the new geo location or for that period is minimal to null. If, however, the user decides to access the game for game play from the second geo location, the cloud gaming system may, at that time, send a request to the first data center to migrate the save data for the game to a new data center at the second geo location. This might mean that the user has to experience a nominal wait, but may be more efficient than unnecessarily migrating save data for a user when he is not known to access the game during that period or at the geo location. This allows the system to conserve the processing, communication and network resources while ensuring that the appropriate save data is readily available at a data center in the second geo location when there is a high probability of the user accessing the one or more games from the second geo location.

In another example, the user may decide to access a game in the second geo location that he has not accessed for a long time even in the first geo location and the save data of the user that was migrated to the second data center may not include the game-related data of this game. In this example as in the earlier example, the user will experience a nominal wait while the cloud gaming system sends a request to the first data center to forward the save date related to this game to the second data center. It should be noted that the data center includes a plurality of game servers and/or game consoles to service a game play request of a game from the user and any one of these game servers or game consoles that have the capability to service the user access request may be used to upload the save data of the user so as to provide current game state of the game during game play.

During game play, a quality-of-service (QoS) testing is performed periodically or continuously by the cloud gaming system to ensure that the quality of the service is maintained at a required level for the user's game play request. During the QoS testing, a QoS engine performing the testing may determine that the bandwidth of data has begun to drop even while the intensity or quality of game play remains high or at a desired level. One reason for the connection bandwidth to drop may be due to the connection speed dropping on the communication line established between the client device of the user and the game server or game console at the second data center and such deterioration in the connection speed may be attributed to either an increased demand placed on the communication line or may be due to increase in the load of the data packets that are being transmitted. Of course, the above example of connection speed dropping is one reason and there may be many other reasons for a drop in connection bandwidth. To maintain the quality, the quality-of-service (QoS) engine within the cloud gaming site may recognize the mismatch and send a signal to the gaming server executing the game logic at the second data center to dynamically lower the resolution of the game data to address the mismatch so that the overall service is not adversely affected. Once the connection speed is restored to original speed, the resolution of the game data may be adjusted to the original level. The adjustment of the resolution is performed in a manner that does not adversely affect the user's gaming experience. With the general understanding of the invention, specific embodiments will now be described with reference to the various drawings.

FIG. 1 illustrates a simplified block diagram of a system used for detecting change in geo location of a user, and for identifying, assigning a data center at a second geo location to service a game play request from the user, in one embodiment of the invention. The system includes a client device 100 that is communicatively connected to a server, such as an application server, on a cloud gaming system 300, over a network 200, such as the Internet.

A client device 100 is any computing device that includes a processor, a memory and network connections to connect to a network and appropriate APIs to communicate with a server-side application. The processor is capable of executing a client-side application that may run standalone or may interact with a server-side application by connecting to the network through the network connections and use application programming interfaces (APIs) to communicate with or access the server-side application. The network connection can be a wired or wireless connection. The client device 100 may be a thin client, a general purpose computer, a special purpose computer, a game console, a personal computer, a lap top computer, a tablet computing device, a mobile computing device, a portable gaming device, a cellular phone, a smartphone, a set-top box, a streaming media interface/device, a smart television or networked display, or any other computing device that can be used to access an application available locally or on a remote server. The network connections and communication protocol used enable the client device 100 to communicate with the remote servers to receive content, including a stream of video frames of multimedia content, from the remote servers, such as servers that are part of the cloud gaming system 300. The video frames streamed by the remote servers have undergone compression using an encoder. The client device 100 may include a decoder to decompress the stream of video frames representing game play content transmitted by the remote servers, and render images on a display screen of the client device 100.

In some embodiments, the amount of processing performed by the client device 100 may vary with respect to input and output processing. Broadly speaking, the current game state of a game is substantially maintained and executed on game and other application servers, with the client device 100 primarily functioning to receive, decode, render audio/video data from the game and other application servers, and communicate user inputs back to the game and other application servers. The client device 100 may be a standalone computing device that is connected to a display device to provide video data for rendering on the display device. In other embodiments, the client device 100 can be integrated into the display device. In one embodiment, the display device is a networked display device providing a platform operating system for applications or "apps" utilizing the network connectivity of the display device. In such an embodiment, the client device 100 can be defined by an application executed on the platform provided by the display device's operating system.

An application server as used in this application is a local server, a virtual computer, a cloud gaming server, a digital media server, a server that is used to provide a storefront of a game developer/game sponsor, a webserver, a terminal server, a console server, a remote server, or any other type or form of server computing device available in a data center that is capable of hosting one or more game applications (including providing or allocating processing resources for executing the game application) that users can access and interact during game play. The application server may include an encoder to compress the data in the video frames and forward the compressed video frames in a data stream to the client device 100 using application programming interface (API) calls that follow specific type of protocol.

For example, an application server, in the form of cloud gaming server, executes the various video games which are being played by the users, defines the various video games' game states from moment to moment, and sends video data (including image data and audio data) to one or more client devices 100 distributed within a particular geo location or across a plurality of geo locations. The client devices 100 at a given geo location(s) process input from the user(s) playing the video game(s), and transmit input data to the cloud gaming server, which in turn processes the input data to affect the game state of the one or more video games. It should be appreciated that cloud-based gaming facilitates multi-player gaming from players located at different geo locations by providing instances of a video game for execution at one or more remote cloud gaming servers that is accessible by all players over the network 200. In this manner, execution of the video game is not dependent on any single player's hardware or network conductivity, though such will affect the user experience for that given player.

The operations performed using cloud gaming architecture described herein form technical operations requiring multiple servers and/or execution platforms to enable quick access to databases and presentation of content, such as game play content, to remotely located client devices 100 of users. Cloud gaming can also include the operations of compression performed by the cloud gaming servers utilizing any number of compression techniques. The compression techniques may use standard encoders, which would then allow the standard decoders on client devices 100 to access, decode and render the image, video and audio data on the client devices 100 to enable game play of the video games. The management of the video games and distribution can include a number of data centers, direction servers, quality-of-service testers or engines, direction and redirection to lower latency data centers. It should also be understood that these operations and tasks will utilize special purpose server computers that are designed for streaming and low latency due to the remote execution of games, and the delivery to the client devices 100.

As mentioned, a data center, in one embodiment, may include a plurality of servers (e.g., gaming servers), storage systems that are capable of storing game codes, application codes, user-related and application-related data stores and making them readily available to enable handling of varied requests from a plurality of users. The data center may also include telecommunication equipment, such as routers, switches, etc., to establish communication connection between the client devices and the plurality of servers. Each of the plurality of servers may be equipped with server-side APIs (either distinct or similar) to communicate with the corresponding client-side API at a client device 100 or with server-side APIs associated with third party social media providers. In some embodiments, the servers in the data center may be configured to execute various types of applications, including gaming applications, etc., and stream the application content to corresponding client devices 100 for rendering. The servers may be configured to perform operations of compression on any data generated or provided by the servers using any number of compression techniques and forward the compressed data available to the client devices using any one of the communication and/or transmission protocols. The servers may include terminal servers, console servers, virtual servers, etc., that are typically used to perform or execute specific functions, games or applications. Some examples of functions, games or applications performed by the servers may include database management, file management, mail service, print service, web service, game management, application management, media management, catalog service, communications management, computing service, and proxy management, to name a few. In some embodiments, a plurality of servers and/or storage devices may be provided as rack-mounted servers or storage devices, with each data center containing rows of server and/or storage racks. Each server may be capable of executing a plurality of applications and/or provide a wide range of services.

When a request to access an application is received from a client device 100, a hosting system, such as a cloud gaming system 300, interacts with user account data processing module 302 to obtain user-related information. The user account data processing module 302 queries and receives user account information from a user account database 304, where user profile and other user account information are stored. The user profile and user account information are used to identify a user associated with the client device 100 from which the request is initiated, and authenticate the user, request. Upon user authentication, the client request is serviced by a server associated with the cloud gaming system.

In one embodiment, a gaming server at the cloud gaming system 300 may determine all the games and/or applications the user is authorized to view or play or interact with, all the games and/or applications the user owns, all the games and/or applications that are available for free, retrieve the titles and return the titles in a list for presenting on an user interface at a display screen of the client device 100. In one embodiment, user interaction at any one of the titles rendered on the client device is detected by a client-side application processing module 110. The user interaction is analyzed to obtain geo location information of the user providing the user interaction, and a signal is sent from the application processing module 110 to the application server on the cloud gaming system 300 providing the geo location information. The cloud gaming system 300 hosts a plurality of applications, including game applications, and is also referred to herein as a "hosting system" 300. In addition to the geo location information, the signal may also include user-selection information, including the application title selected, user identification, day of week, date, time of day when the user interaction was initiated, client device identifier, etc. In another embodiment, user interaction may be related to initiation of a web browser. The signal from the web browser at the client device 100 to a web server may be used to obtain the geo location of the user, such as the client's IP address, the client's ping information, to name a few. In such embodiment, the retrieval of the signal and identification of geo location may be performed at the hosting system 300 by the application server. In other embodiments, the geo location information of the user may be obtained by the client-side application processing module 110 from a Global Position System (GPS) mechanism within the client device. Of course, the aforementioned ways to detect the geo location of the user are mere examples and other types of mechanisms, tools or logic may be used to determine the geo location of the user.

In response to the geo location identification obtained by the user interaction at the client device 100, a data center manager module 400 available at the hosting system 300 performs a geo location verification step. The geo location verification step includes querying the user profile of the user to identify a geo location associated with the user and determining if the geo location identification obtained from the user interaction at the client device 100 is the same geo location that is in the user profile or relates to a new geo location. The user profile of the user is obtained by the data center manager 400 by querying a user account data processing module 302. The user profile provides user-related information including user identifier, user screen name, user geo location, and other data that can be used to distinctly identify the user (including biometric data), as well as the user's preference of applications, to name a few. If the geo location information obtained from user interaction identifies a new geo location, the data center manager 400 analyzes user's game play history to determine usage trend of the user. In some embodiments, the game play history may be part of the user profile. The usage trend identifies use pattern of the user in relation to the various applications, games, etc. The use pattern is used to determine a list of application the user usually interacts with, time of day or week that the user interacts with these applications, amount of time spent in each application, etc., and to intelligently predict when the user will subsequently interact with an application, such as a game.

Based on the usage trend of the user for the various games, and in response to detecting change in the geo location of the user, the data center manager 400 will identify a data center from among one or more data centers (DC1 . . . DCn) at the new geo location, such that the identified data center has processing and communication connection capabilities for servicing the subsequent requests for game play of a game from the user at the second geo location. Once the data center has been identified, the data center manager 400 may send a signal to a save data migration manager 500 to provide current state for the one or more games that the data center manager 400 predicts the user will be accessing during his next user session at the second geo location, based on the access pattern information obtained from the user's prior interaction history.

The save data migration manager 500 receives the signal from the data center manager 400 and, in response, identifies relevant save data related to the specific ones of games that needs to be migrated from a data center in the first geo location to the data center in the second geo location identified by the data center manager 400. To assist the save data migration manager 500 in identifying the appropriate save data, the signal from the data center manager includes the game identifiers for which the save data needs to be migrated. Once the save data is identified, the save data migration manager sends a command to the data center (DC1, DC2, . . . DCn) in the first geo location to migrate the identified save data for the specific ones of the games. A server or a console in the data center at the first geo location receives the command, responds to it by automatically establishing communication connection with a server or console in the second data center at the second geo location and begins transmitting the relevant save data to a server or console at the second data center. It should be noted that when the relevant save data is migrated from the first geo location to the second geo location, a copy of the relevant save data is also maintained in the first geo location. The migration is carried out prior to receiving any request from the user for interacting with the specific ones of the games, at the second geo location. In other words, the migration is done in response to detecting change in the geo location of the user and in anticipation that the user will interact with the specific ones of the games from the second geo location, based on the usage trend of the user.

Once the migration is complete, the cloud gaming system 300 will assign a server at the data center in the second geo location to service the user's subsequent requests for game play of one or more games. During game play, the cloud gaming system may engage a quality-of-service (QoS) engine 350 to perform QoS testing of the server at the data center in the second geo location to ensure that the user has comparable game play experience as provided by a data center in the first geo location of the user. When it is determined that the quality is comparable, the server and the data center are retained. When it is determined that the quality is poor, the server and/or the data center is switched to a different server and/or the data center so as to allow the user to have comparable game play experience. When none of the data centers in the second geo location can provide the comparable game play experience to the user, the QoS engine 350 may generate a signal to the server to reduce the resolution of the game data or to adjust the resources to provide a reasonably comparable experience to the user.

When the user selects and interacts with the specific ones of the games, the user interactivity captured at the client device is forwarded as input to the game server(s) that is executing the specific ones of the games. The user interactivity input is used to update game state of the specific ones of the games. It should be noted herein that although the various embodiments are described herein with reference to a user accessing a game from the cloud gaming system, the embodiments can be extended to allow a user to access an application and the save data would be directed toward providing a current state of the application.

When the user logs into his user account at the cloud gaming system from the second geo location and selects a game for game play, an instance of the game logic for the game executing on the server or console at the second data center provides instant access to the game. The game access allows the current game state of the game to be provided to the user at the client device 100 to allow the user to resume his game play of the game from where he left off in his previous game play session at the data center in the first geo location. The current game state of the game was updated from the relevant save data of the user that was migrated from the first data center and stored locally in a save data datastore 107 at the second geo location.

User interactions at the second data center are tracked for the game and the save data of the user is updated to the save data datastore 107 by the server or console at the second geo location, so as to provide current state of the game. Additionally, in some embodiments, the updates may also be forwarded to the first geo location for updating the copy of the relevant save data of the user so that the current state of the game is available for the user at the first geo location. This may be done in response to detecting change in the user's geo location from the second geo location to the first geo location, or in anticipation that the user will return to the first geo location and resume his interaction with the game from the first geo location.

Figure 2A:
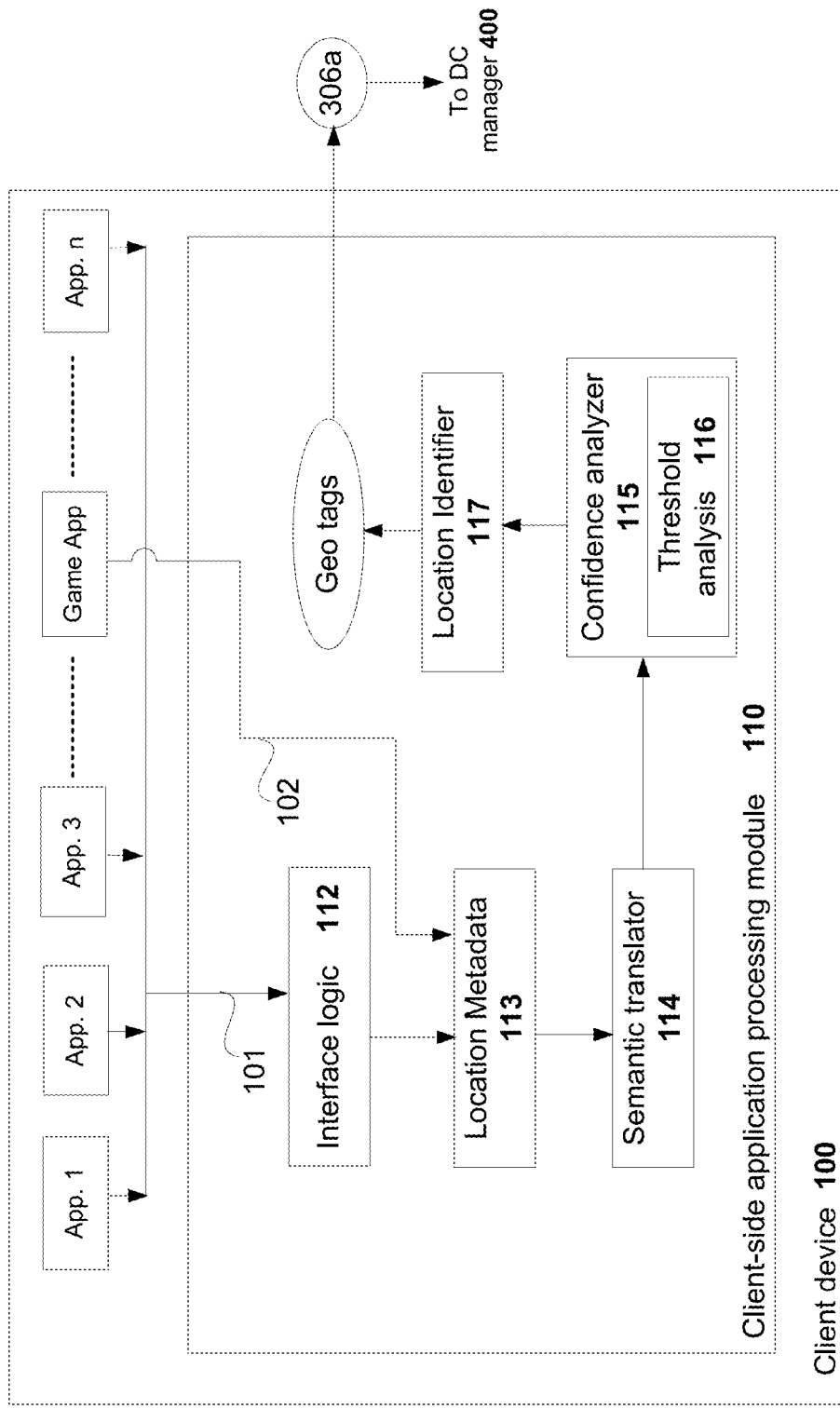
FIG. 2A illustrates an example client-side application processing module provided on a client-device for generating a signal of a change in geo location, in accordance to an embodiment of the present invention.

FIG. 2A illustrates the various modules within the client-side application processing module 110 that is used to identify the user and the current geo location of the user, in one embodiment. The client-side application processing module 110 may interact with a plurality of client-side applications, such as App. 1, App. 2, App. 3, game application 111, . . . App. n., available at the client device 100. The application processing module 110 may be available on the client device 100, such as user's mobile device or personal computer, etc., and is initiated whenever a user interacts with any one of the client-side applications. When a user interacts with a client-side application, the user interactions are transmitted to a corresponding server-side application executing on a game console or game server of the cloud gaming system 300, through appropriate client-side and server-side APIs. The user interactions are used to affect an outcome of the application, which may be transmitted back to the client-side application for rendering on the client device 100. Additionally, the application processing module 110 may detect the user interactions at the different client-side applications, analyze the user interactions to determine a current geo location of the user.

The application processing module 110 does not wait for the user to log in to a game hosted by a cloud gaming system 300 to determine the current geo location of the user and it does not wait for the user to explicitly provide the geo location information. Instead, the user interaction at different applications available on the user's client device 100 may be used to determine the user's current geo location. Alternately, the application processing module 110 may retrieve signals from mechanisms or applications that are native within the client device 100 to determine the current geo location of the user. For example, in some embodiments, the application processing module 110 may retrieve off-network signal (i.e., a pre-game signal or pre-application signal) from a global positioning system (GPS) available within the client device and analyze the off-network signal to identify geo location information. The geo location information is interpreted to generate geo tags 306a, which is then transmitted to a server on the cloud gaming system 300 for further processing. In another example, the signal from a native application may be retrieved by the application processing module 110 and transmitted as a "heartbeat signal" periodically to a server within a cloud gaming system for further processing. The heartbeat signal (e.g., off-network signal), as used in this application, may be a signal that is generated by a native tool or mechanism, such as a global positioning system, etc., that is capable of generating a signal with location data without requiring the client device to connect to a network 200, such as the Internet. In an alternate embodiment, the heartbeat signal (e.g., pre-application signal) may be generated by user interaction with an application, when a user uses the application that is native to the client device to view information, such as a calendar application, a telephone contact application, etc. In another embodiment, the heartbeat signal (e.g., pre-game signal) may be an on-network signal generated when a user interacts with one or more client-side applications (e.g., App 1, App 2, App 3 . . . App n) that is available within the client-device to access the corresponding server-side applications, such as social media applications, electronic mail applications, shopping application, etc.

The user interaction with the client-side applications (App 1, App 2, App 3 . . . App n) may trigger activation of an interface logic 112. The interface logic 112 is configured to capture some data or activity pertaining to the user's interaction with the client-side applications that may or may not be used to access the corresponding server-side applications. For example, App 1 may be social media application, App 2 may be an electronic mail application, App 3 may be a shopping application, App 4 may be a travel application, App 5 may be a calendar application, App 6 may be a clock application, App 7 may be a telephone application, etc. When a user interacts with App 1, some of the data exchanged through user interactions, between the client-side application and the corresponding server-side application may be captured by the interface logic 112, as shown by arrow 101. In some embodiments, the data captured by the interface logic 112 includes public data and such data may include geo location information. In some embodiments, where the user interacts with a native application that does not interact with a server-side application, the data gathered from the user interaction may include set-up data (or application settings) of the native application and such set-up data may include geo location information related to the user. The geo location obtained from the native application may not provide a current geo location when a user moves to another geo location but would give a geo location that can be compared with geo location obtained from other applications to determine if the user has moved from one geo location to another geo location. In some embodiments, the native application may provide the current geo location if the native application is configured to update the geo location in its set-up data with geo location detected from other applications.

In other embodiments, the user may interact with a client-side application, such as game application 111, that is native to the client device 100 and the user interaction may be directed toward interacting with a server-side game application hosted on a cloud gaming system 300. In such embodiments, the data gathered from such user interactions may be provided directly to a location metadata module 113 without going through an interface logic module 112, as shown by arrow 102.

The location metadata module 113 receives data captured by the interface logic 112 or client-side game application 111, analyzes the data to identify any geo location information contained within. Data captured by the interface logic 112 and the data provided by the game application 111, in some embodiments, may include a variety of information. For example, the data may include an internet protocol (IP) address (i.e., router address) that is used by a client device 100 to access and exchange data between client-side application (i.e., App 1 (client)) and the corresponding server-side application, (i.e., App 1 (server)). In another example, when the user accesses the Internet through a web browser application on his mobile device (i.e., client device), the IP address may be related to the cellular tower that services the user's network access request. The IP address is one form of data captured to identify a geo location of a user and other forms of data may be captured to identify the geo location of the user. For example, ping information obtained for a ping command issued from a user's client device may be used to obtain geo location of the user.

The captured location data (e.g., IP address) is passed on to a semantic translator 114 to determine the appropriate geo location of the user. The semantic translator 114 includes logic that is configured to translate the IP address provided by the location metadata module 113 into appropriate geo location information. The translated geo location information is forwarded to a confidence analyzer 115 for verification of the geo location of the user.

The confidence analyzer 115 includes logic to verify the translated geo location information provided by the semantic translator 114 is indeed correct for the user. In some embodiments, the confidence analyzer 115 may verify the geo location information by obtaining additional geo location data from the client device. For example, the confidence analyzer 115 may wait for the semantic translator 114 to provide the additional user interaction data to confirm the user's geo location. The semantic translator 114 may obtain the additional user interaction data based on the user's access of other applications on the client device 100. The confidence analyzer 115 receives the additional user interaction data and uses information provided in the additional user interaction data to verify the user's geo location. In some embodiments, the confidence analyzer 115 may perform a predefined number of verifications to confirm the current geo location of the user. For example, the predefined number of verifications may be set at 3. In such case, the confidence analyzer 115 may receive three more sets of additional data and perform the verification step to confirm that the current geo location of the user as identified by the location metadata module 113 and as translated by the semantic translator 114, is indeed correct. In some embodiments, the three different sets of additional data may be received from the user interaction at a single application captured over a period of time. In alternate embodiments, the three different sets of additional data may be received from different applications, based on the user's interaction with the different applications. The confidence analyzer 115 may engage a threshold analysis 116 to track the number of times the verification is to be performed to determine the current geo location of the user.

Once the geo location information has been translated by the semantic translator 114 and verified by the confidence analyzer 115, the translated geo location information is processed to generate a geo tag. A location identifier 117 may be engaged to process the translated geo location information to generate the appropriate geo tag 306a. The geo tag 306a may include a set of coordinates (e.g., latitudes and longitudes) so that the cloud gaming system 300 may interpret the coordinates to identify an appropriate data center. The generated geo tag 306a associated with the user is forwarded to a data center manager 400 in the cloud gaming system 300 by the client-side application processing module 110, where the geo tag is interpreted.

In another embodiment, the heartbeat signal with geo location information may be captured by the cloud gaming system directly as the signal passes through the network connection to the corresponding server-side application. The signal may be captured based on Wi-Fi settings in the client-device 100. The Wi-Fi is a wireless local area wireless computer networking technology that allows client devices, such as PCs, video game consoles, smart phones, digital cameras, tablet computers, digital audio players, etc., to connect to the network, such as the Internet, via a wireless network access point. As a result, the signal may be extracted from the wireless network access point by a signal extractor logic (not shown) of the application processing module 110 through appropriate API calls and forwarded to the cloud gaming system 300 for analysis and interpretation to identify the user's current geo location. Irrespective of the source from where the geo location data is captured, the cloud gaming system 300 is provided with either a geo tag that identifies the user's current geo location or a signal with geo location information for further processing and interpretation.

A user, for example, accesses a shopping application using an IP address of an internet service in Chatham-Kent, Ontario, Canada. However, his subsequent access requests for an electronic mail application, for example, were initiated from a different IP address (e.g., IP address corresponding to IP service in Detroit, Mich.). In such a case, the confidence analyzer 115 will wait to receive additional data from the applications that the user interacts with (e.g., shopping application, electronic mail application), and perform a verification operation to determine which of the two IP addresses is actually correct for the user. Based on the verification operation performed by the confidence analyzer 115, it may be determined that the user's current geo location is indeed Detroit, Mich. The verified geo location is associated with the user and is sent to the cloud gaming system 300 for updating the user profile of the user (if needed) and forwarded to the data center manager 400 within the cloud gaming system 300 to use for assigning an appropriate data center for servicing the requests of the user.

In some embodiments, the cloud gaming system 300 may include application APIs, such as social media APIs, to directly interact with the social media systems to get user-related information from the social media posts or feeds. In such embodiments, the cloud gaming system 300 makes an API call to get social media feeds or posts of the user and analyze the social media feeds or posts to determine a current geo location of the user. In some embodiments, the social media feeds or posts that are retrieved from the API call are public data. In one embodiment, the information through the API calls may be used to further verify the current geo location of the user. It should be noted that such API calls are external to the console application 111 that is available in the client device 100 and are part of the cloud gaming system 300 that is a part of the cloud network.

Figure 2B:
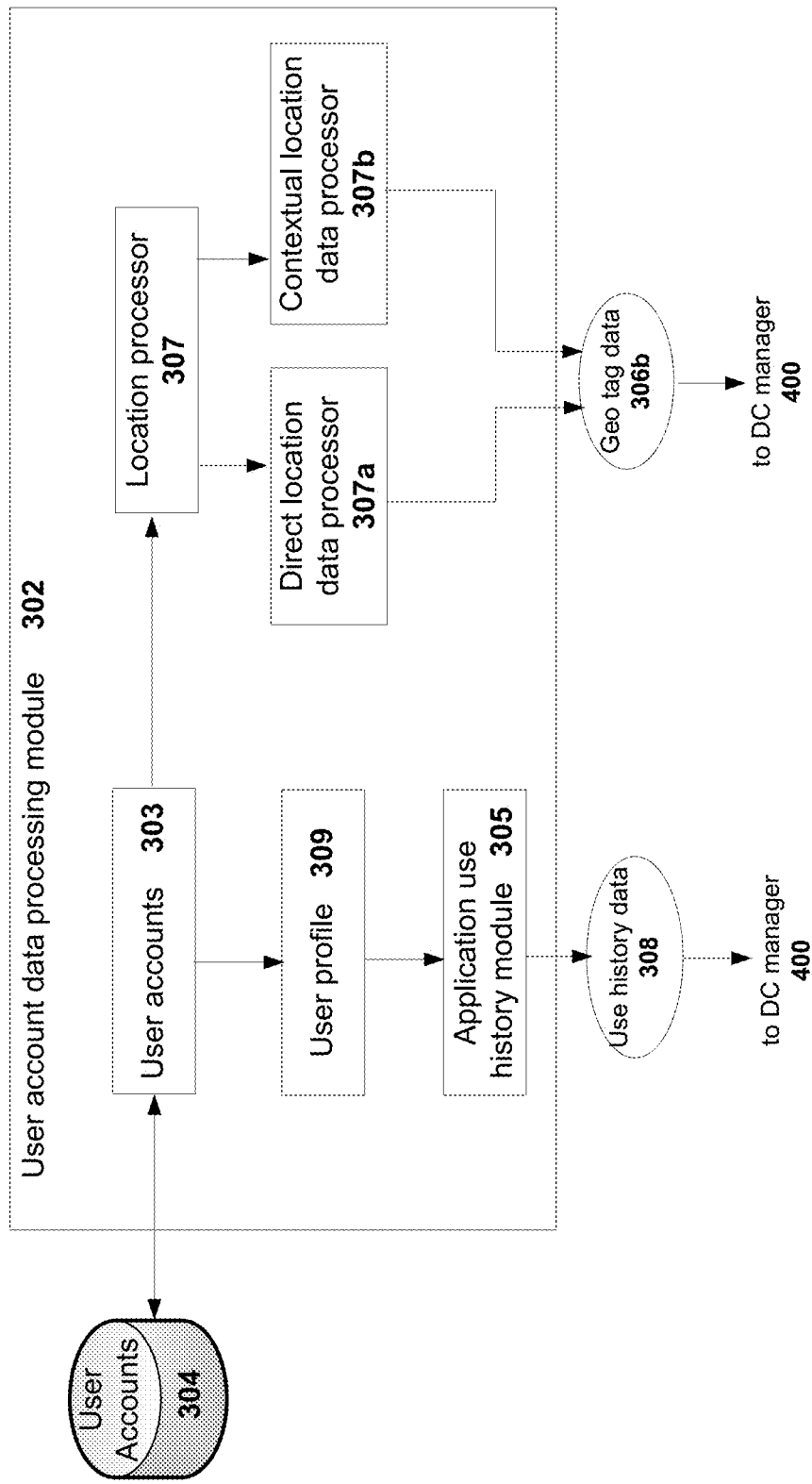
FIG. 2B illustrates an example user account data processing module within an application hosting system to provide use history of a user that is used to identify save data for migrating to a data center in a different geo location, in accordance with one embodiment of the present invention.

FIG. 2B illustrates different modules within a user account data processing module 302 that is available within a cloud gaming system 300 for accessing and interpreting such external signals, in one embodiment. When a social media interaction is initiated at the client device 100 of a user, the user account data processing module 302 is triggered to verify the user initiating the social media interaction. The data processing module 302 engages a user accounts module 303 to verify the user and such verification is done using user account information stored in a user account database 304. In one embodiment, a location processor module 307 is used to retrieve data from social feed(s) of the user by making social media API calls to a social media system server that is hosting the social media and the retrieved data is interpreted to determine current geo location information of the user, using a direct location data processor 307a. In some other embodiments, the API calls may be directed to wireless network access points within the client device to retrieve the social media interactions generated by the user as it is being transferred over the network to the social media server for posting into the user's social media account. In such embodiments, the social media interactions are contextually analyzed using semantic translation logic within a contextual location data processor 307b, for example, to obtain the current geo location information of the user. The location data is interpreted using a server-side location identifier module (not shown) that is comparable to the client-side location identifier module 117 of FIG. 2A, to identify geo tags 306b for the current geo location information. The interpreted geo tag data 306b of the user are forwarded to the data center manager 400. Of course, the social media application is one example application that is used to obtain the geo tag information and that other applications App. 1 . . . App. n, may be used to obtain the geo tag information.

In addition to providing the geo location information, the data processing module 302 may interact with a user profile module 309 to retrieve user profile information from user account database 304 and analyze the user profile information to obtain application use history of the user. In one embodiment, the user profile information includes user credential data that is used to validate a user and the user's access requests, application data that is used to determine which games and applications the user is authorized to use or interact with, access location information that is used to identify geo locations from where the user accesses the cloud gaming system, social data of the user identifying social relationship information including social graphs, social contacts, etc. An application use history module 305 may be used to analyze the user profile information of the user to determine usage trend of the user for the various applications, games. The usage trend may be obtained by collecting the use history of the various applications, games that the user interacted with over time using the user account. In some embodiments, the use history may provide information related to the various games that the user interacted with over time. Information gathered from such use history may be used to identify other related games, applications for presenting to the user for user interaction, and to also identify the user's game preferences so as to predict which games the user is likely to access next and when the user is likely to access those games. For example, the use history provides a rich source of information that can be used to determine the user's usage trend for the various games by identifying the user's preferences of the various games available on the cloud gaming system, the frequency of access of these games, amount of time spent, time of day when the games are accessed, user's expertise level, type of user interaction registered for each game, type of game, intensity of game play desired, etc. The application use history module 305 gathers such use history information and forwards the application use history 308 to the data center manager for processing the user interactions.

Figure 2C:
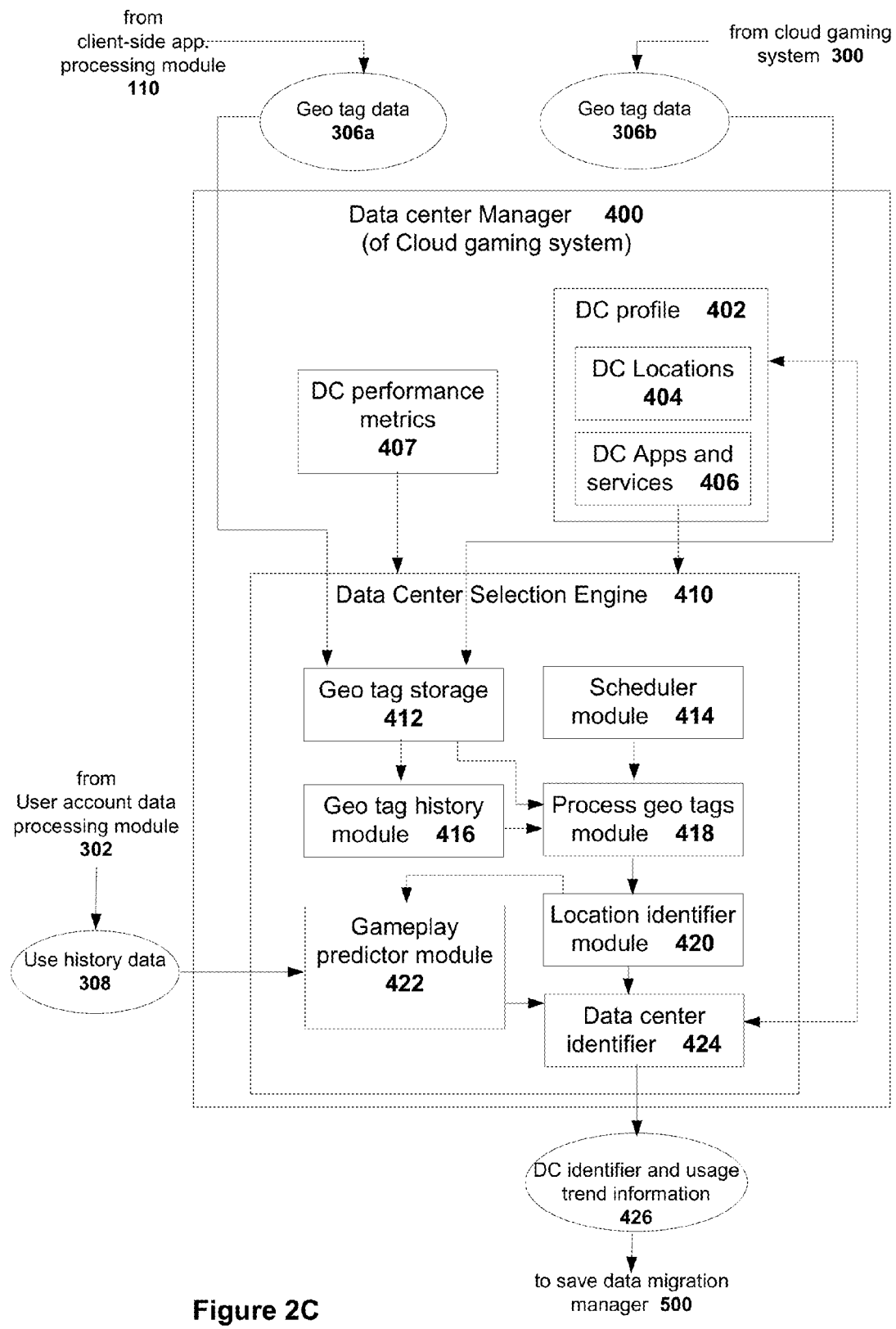
FIG. 2C illustrates an example data center manager module within an application hosting system to identify a data center based on a geo location of a user, for migrating save data of the user, in accordance to an embodiment of the invention.

FIG. 2C illustrates the various modules within a data center manager 400 of a cloud gaming system 300 that is used to identify a data center within a new geo location detected for the user, in one embodiment. A change in the geo location may be determined by the data center manager 400 based on geo tag data 306a provided by the client-side application processing module 110 and/or geo tag data 306b provided by a server in the cloud gaming system. In some embodiments, the client-side application processing module 110 at the client device forwards the geo tag data 306a related to the user's current geo location to the data center manager 400 at the cloud gaming system only when a change in the geo location of the user is detected. In addition to receiving the geo tag data 306a, 306b, the data center manager 400 receives gaming and/or application use history 308 of the user from the data processing module 302 of the cloud gaming system. The geo tag data 306a, 306b and the application use history 308 are processed by the data center selection engine 410. The data center selection engine 410 uses the geo tag data 306a, 306b to identify an appropriate data center for the user at the new geo location (i.e., second geo location), and uses the application use history 308 for identifying relevant portion of save data of the user for migrating to the appropriate data center at the second geo location. Information provided in application use history 308 is assessed to identify number and types of activities of the user, and use this information to identify relevant portion of save data for migrating to the appropriate data center. In some embodiments, the assessment would identify the activities of the user in reverse chronological order so that the most recent activities of the user are used in identifying the relevant save data for migration. In other words, the assessment is used to determine appropriate identification and order of transmission of save data to a second data center in a second geo location.

In order to determine the appropriate data center, the data center manager 400 queries a DC profile module 402 to identify data centers that are available within the second geo location. The DC profile module 402 includes a DC locations module 404 and a DC Apps and Services module 406. The DC locations module 404 maintains a list of data centers distributed across different geo locations and accessed through the cloud gaming system (i.e., hosting system hosting the various applications, games). The list may be organized by geo locations and stored within a DC data store (not shown). The DC locations module 404 is used to query the list of data centers to identify select ones of the data centers that are in the vicinity of the second geo location. The DC Apps and Services module 406 is then used to identify a list of servers and consoles available within each of the identified data centers and a list of Apps or services that each server or console within data center is executing or is capable of executing.

Information from the DC Apps and Services module 406 corresponding to the select ones of the data centers in the second geo location is forwarded to the data center (DC) selection engine 410, to allow the DC selection engine 410 to identify a particular data center in the second geo location to migrate the relevant save data of the user. In order to allow the user to have application interaction experience at the second geo location that is comparable to the one experienced by the user in the first geo location, the DC selection engine 410 has to ensure that any data center that is identified includes the required communication connection and processing resource bandwidth to allow execution of the one or more games the user is predicted to select for game play.

In order to determine which ones of the data centers has resources and communication connection attributes for providing a comparable experience to the user at the second geo location, a DC performance metrics module 407 is used to retrieve data center profile of each of the data centers identified in the vicinity of the second geo location. The data center profile identifies each data center's processing and communication attributes that can be used to select a data center for migrating the save data. The DC performance metrics module 407 maintains data center profiles history for all the data centers available at the cloud gaming system 300. The information in the data center profile for each data center is constantly updated as and when requests for one or more applications or games is serviced by the respective data center and as users exit their game play sessions, so as to provide up-to-date data center metrics defining a current status and resource capabilities of the respective data centers. For e.g., the up-to-date data center metrics may identify type of processing and/or system resources available, status of each of the processing resources at the data center, types and number of game instances of a game or a plurality of games available at the data center, current demands placed on the resources available at the data center, etc. The DC manager 400 uses the data center attributes to identify a data center in the second geo location for migrating the save data for the one or more games, in anticipation that the user selects one of these games for game play from the second geo location, and the data center has the capability to service such game play requests. It should be noted that the second geo location is different from the first geo location that is originally associated with the user. For example, a user A may be originally associated with San Jose, Calif., where he lives and works. As a result, user A may be assigned to a data center that is local to or in the vicinity of San Jose, Calif., such that the data center has the required processing, communication and network resources to service game play request of a game from the user. When user A travels to a new geo location for business or on vacation, user A's geo location changes from San Jose, Calif., to Chicago, Ill., for example. The DC manager 400 recognizes the change in the geo location of the user either by signals generated by the GPS mechanism within the client-device or by signals generated by user's interaction on the client device 100, and identifies a plurality of data centers that are local to the second geo location (i.e., Chicago area, from the above example).

The DC manager then queries the DC performance metrics module 407 to obtain data center metrics of each of the plurality of data centers in the Chicago area. The up-to-date data center metrics from the DC performance metrics module 407 is forwarded to a data center selection engine 410 for analysis. The data center selection engine 410 includes a plurality of sub-modules to receive use history of games and determine usage trend of the user for each of the games identified in the use history. The DC selection 410 also receives and analyzes the data center metrics for each of the data centers in the vicinity of the second geo location (i.e., Chicago area, from the above example). The DC selection engine 410 identifies a data center to migrate the relevant save data of the user, based on the DC metrics and usage trend of the user for the various games. Some of the sub-modules included in the DC selection engine 410 include a geo tag storage module 412, a geo tag history module 416, a scheduler module 414, a process geo tags module 418, a location identifier module 420, a gameplay predictor module 422 and a data center identifier module 424. Of course, the above list of sub-modules is just an example and fewer or more sub-modules may be available within the DC selection engine 410 to analyze the use history of the user and to identify a data center at a particular geo location.

The DC selection engine 410 uses a geo tag storage module 412 to store the geo tag data received from the client device 100 and/or the cloud gaming system, within the geo tag storage database (not shown). The geo tag data each user is also updated to geo tag history of the respective user using a geo tag history module 416. The geo tag history module 416 maintains all the geo tags 306a, 306b associated with each of a plurality of users, and is used to provide historical geo tag information for each user. The historical geo tag information may be used for confirming and/or verifying current geo location of a user. A scheduler module 414 defines an update schedule for processing the geo tag information so as to update geo tag storage. In some embodiments, the scheduler module 414 may define a batch update schedule that allows the geo tag data 306a, 306b to be processed once a day, once a week, once in two weeks, etc. Alternately, the scheduler module 414 may define an update schedule that allows the geo tag data 306a, 306b to be processed every 4 or 6 hours, or after expiration of a pre-defined period or when the number of geo tag data 306a, 306b received exceeds a pre-defined amount. It should be noted that the geo tag storage receives geo tag data 306a, 306b from a plurality of users that are using the cloud gaming system and is not restricted to a single user. As more and more users interact with the cloud gaming system, the number of users whose geo tag data 306a, 306b needs to be updated to the geo tag storage grows and the scheduler module 414 may schedule these updates more or less frequently in accordance to the cloud gaming system usage.

Current geo tag data from the geo tag storage module 412 and the prior geo tag data from the geo tag history module 416 are provided to the process geo tags module 418 for processing. The process geo tags module 418 receives the process schedule for processing the geo tag information, from the scheduler module 414 and processes the geo tags in accordance to the process schedule. In one embodiment, as part of processing the geo tags, the process geo tags module 418 may analyze the current geo tag data of the user obtained from the geo tag storage module 412 and verify the geo tag data against the prior geo tag data of the user provided by the geo tag history module 416 to determine if there is a change in the geo location of the user. When a change in the geo location of the user is detected, the process geo tags module 418 forwards the current geo location data of the user to a location identifier module 420. The location identifier module 420 uses the current geo location data to identify the location coordinates (e.g., longitudes and latitudes). The location coordinates are updated to a user profile of the user, as well as the geo tag history data for the user to reflect the user's up-to-date geo tag history. The location coordinates identifying the current geo location of the user is forwarded to a data center identifier module 424. The data center identifier module 424 uses the location coordinates and interacts with the DC profile module 402 to determine which data centers are in the vicinity of the user's new geo location, and what applications and services are available in each of the data centers within the vicinity of the user's new geo location, in order to determine which data center to select to migrate the relevant save data of the user.

The DC selection engine 410 also includes a gameplay predictor module 422 to intelligently predict which ones of the games that the user may access in a subsequent user session initiated from the new geo location, so that the relevant save data may be identified for migrating to the new geo location prior to receiving the user's request for such data from the new geo location.

In one embodiment, the gameplay predictor module 422 is used to determine the usage trend of the user based on the game play metrics captured from user interactions with the game during prior game play sessions. The gameplay predictor module 422 receives the application use history 308 of the user provided by the user account data processing module 302 and updates user's game play metrics for each user account maintained in the cloud gaming system that is used to access the games(s). The user's game play metrics identifies the use history for each game selected for game play from the cloud gaming system by determining game identifier, date, time of day, type of game, performance use of the game, skill or expertise level of the user, current geo location of the user, amount of time spent, frequency of access, performance requirement desired for the game, system requirement, etc. The performance use related to a game may further include display option, graphic intensity of the scenes, level of game the user has mastered, level of game the user is currently playing, level of game the user likes to begin playing, mode of game play (multi-player or single user game play, shared vs. un-shared game play), etc. In some embodiments, the historical data provided in the user's game play metrics may be organized in reverse chronological order for each user with the game that was accessed recently at the top and the game accessed a long while ago in the bottom of the list of games.

In some embodiments, historical data provided in the user's game play metrics is used by the gameplay predictor module to intelligently predict which one or more of the games the user is likely to access from the second geo location during the period the user is in the second geo location. For example, if user A is known to access games 1, 2, and 7 for game play from the first geo location every Friday night and Saturday night, the gameplay predictor module will determine this usage trend for games 1, 2 and 7 from the use history data of the user, and when the user travels to a second geo location, the gameplay predictor module predicts that the user A will continue this usage trend for the same days. Based on the prediction, the gameplay predictor module identifies at least a portion of the save data of the user related to these games (games 1, 2 and 7), for example, that needs to be migrated. In order to identify the appropriate save data for the user, the gameplay predictor module 422 indexes the save data of the user in accordance to the user's preferences for such data. From the above example, it may be determined that most of the times the user plays games 1, 2 and 7 more often than other games, that the user begins his game play session by playing game 7 first before playing games 1 and 2, and that the user spends more time in each game play session playing game 2 more than games 1 and 7, etc. It should be noted that even if two users have similar interests in games, each user's game play sequence and time spent in each game may be different. As a result, the gameplay predictor module 422 defines relative weight for each type of user metrics (e.g., game identifier, sequence of game play of different games, time spent playing each game, etc.) and organizes each user's save data by indexing the save data based on relative weight accorded to each type of user metrics identified from game play of that user. It should be noted that for a plurality of users playing the same games, each user's game play sequence and time spent on those games may be different from other users. As a result, the indexing of the save data for each user may be different. The indexing captures the user's preference of the games so that the save data of those games that is used the most by each user or is most relevant to the user is ranked higher than for those games that are used less. As each user continues to play different games, the indexing of the respective user's save data is adjusted to correctly capture the user's current preferences for the different games. It should be noted that the sequence of games played by a user may differ from day to day and the indexing of the respective user's save data need to take into consideration such variations when indexing. In some instances, the indexing of the respective user's save data may be updated or augmented as additional save data is obtained, in response to the respective user's continual engagement in game play of the one or more games.

The indexing allows the gameplay predictor module to prioritize the save data of the user in accordance to the usage trend for particular ones of the games for different periods so that when the save data of the user needs to be migrated for a specific period, the gameplay predictor module may be able to quickly identify the relevant save data for the user that needs to be migrated. In some embodiments, the user may select a game that he has not played recently, for game play from the second geo location. This might be a game that the user newly acquired, or an old game that a social contact or friend recommended. In such a case, the save data that was migrated may not include data from the user's prior game play of this game. The user may have to wait till the save data for the game is identified from the user's prior game play and updated to the data center at the second geo location before he can begin playing the game. Alternately, the user may begin playing the game from the beginning and generate current game play data for the game. Such wait or restart of an old game may be a small price to play as majority of the times the user is provided with relevant save data to continue playing a game from his prior game play session.

In some embodiments, the gameplay predictor module 422 analyzes the use history data of the user to identify user and data center metrics of the data center in the first geo location that was used to service the user A's prior game play requests. Some of the user and data center metrics identified by the gameplay predictor module 422 may include performance requirement expected at the data center, desired game play intensity of the user, system requirements, storage requirements, processing resource requirements, communication connection requirements for communicating game data, etc. In some embodiments, the processing and communication requirements may be obtained from game specifications defined by a developer of the game. The user and data center metrics are forwarded to the data center identifier module 424 for identifying an appropriate data center that meets the needs of the user.

The data center identifier module 424 receives the user and data center metrics information and uses this information to identify a data center in the second geo location that can meet or exceed the requirements. In some embodiments, it may be determined that none of the data center in the vicinity of the second geo location have all of the resources needed for servicing the user's next game play session of select ones of the games, so as to provide a comparable game play experience for the user. In such embodiments, the data center identifier module 424 may assign a weight for each of the resources that are needed for servicing anticipated requests of game play of select ones of the games. For example, based on analysis of user metrics and game metrics, it may be determined that a user's anticipated request for game play of games during a subsequent game play session from a second geo location includes one or more games that are computation intensive or graphic intensive, or speed based (e.g., car racing game), etc. Some of the game metrics that may be used in assigning the data center for servicing user's anticipated request, for example, may include game identifier, intensity of game, type of game—single user or multi-user, shared or un-shared, etc., intensity of game scene, speed of game, game levels, etc. The data center identifier module 424 weighs the resource requirements for servicing the anticipated requests from the user, and uses the weighted resource requirements to identify a data center in the second geo location. For example, for a computation intensive game, the processing and storage resources may be weighed more than networking resources. As a result, the data center that has sufficient processing and storage resources may be identified for migrating the save data of the user. In another example, for a speed intensive game, communication connection and network resources may be weighed more than processing and storage resources. Consequently, the data center that has communication connection and network resources may be identified for migrating the relevant save data of the user. Thus, based on the type of game requests that may be anticipated, amount of time a user spent playing such games in prior game play sessions and type of resources required to service such requests, an appropriate data center is identified at the second geo location. In circumstances when save data of a user related to more than one game is to be migrated, each games resource requirements are weighed in and a data center is identified in the second geo location that can match the resource requirements of the majority of games, or the game that was played recently or game that was played more than the others. As evidenced, different criteria may be used to identify the data center for migrating the save data of a user.

Once the data center in the second geo location and the relevant save data are identified for servicing the user's anticipated request at the second geo location, the data center identifier and relevant save data identification information, along with use history data of the user 426 are forwarded to the save data migration manager 500 with a request to migrate the relevant save data of the user to the identified data center in the second geo location. The save data migration manager 500 processes the request and issues a signal to the data center in the first geo location to migrate the relevant save data of the user to the identified data center in the second geo location.

Figure 2D:
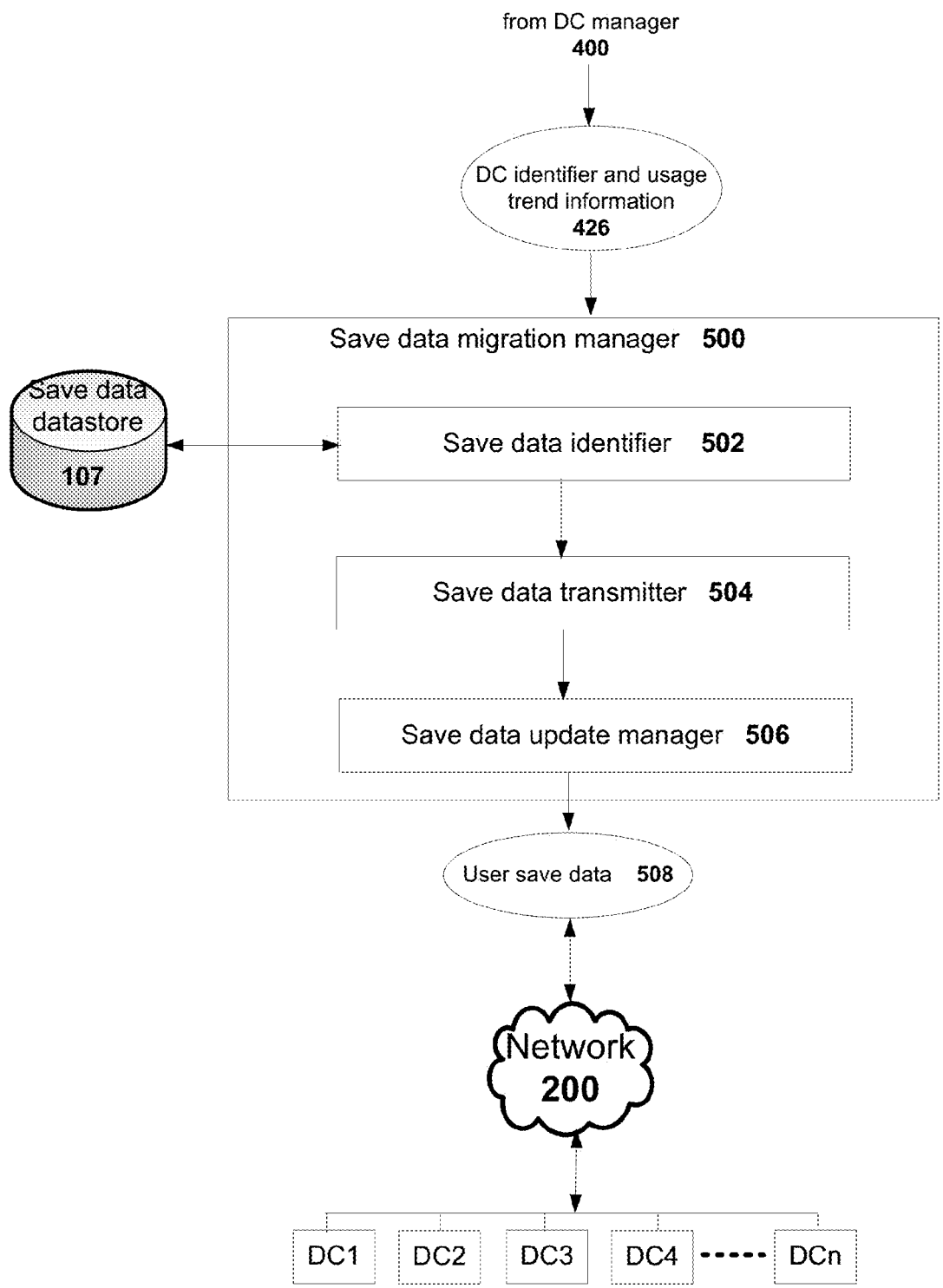
FIG. 2D illustrates an example save data migration manager module within an application hosting system to identify a portion of the save data of a user that needs to be migrated, in accordance with an embodiment of the invention.

FIG. 2D illustrates the various modules and role of the various modules within a save data migration manager 500 in migrating the relevant save data to an appropriate data center in the second geo location, in one embodiment. The save data migration manager 500 receives, as input, the data center identifier for the data center in the first geo location to retrieve the relevant save data, the data center identifier for the data center in the second geo location for migrating the relevant save data, relevant save data identification information, and the use pattern of the user for the various applications 426 provided by the DC manager. The save data migration manager 500 processes the input to determine if the relevant save data has to be migrated, and such determination is based on the use pattern of the user. In some embodiments, the use pattern is analyzed to determine a user's likely access of select ones of the games from a second geo location. In order to determine a user's likely access of a game from the select ones of the games, from a second geo location, the usage trend of the user is analyzed and a probability of use of the game is computed. The computed probability of use is compared against a pre-defined confidence threshold. When the computed probability of use is greater than the pre-defined confidence threshold, it is more likely that the user will access the game from the second geo location. The confidence threshold defines a level of confidence that the user will select the game for game play or view at a certain time from the second geo location. For example, the user's use pattern may identify that the user plays Game 1 only on Tuesdays at 6:00 p.m. In this example, the user may be in the second geo location on Thursday and Friday of the week returning back to the first geo location on Friday night. Based on the use pattern and the time period the user is in the second geo location (i.e., changes detected from user interaction at different applications on the client device or from signals generated from tools/applications in the client device), the save data migration manager 500 may determine the probability of use of Game 1 by the user is below a pre-defined confidence threshold for Thursdays and Fridays (i.e., the time period the user is in the second geo location), but is above the pre-defined confidence threshold on Tuesdays.

In some embodiments, the confidence threshold may be set at 50%. In other embodiments, the confidence threshold may be pre-defined to be at 70% or 80%. Based on the probability of use of Game 1 and the time when a change in the geo location is detected, the save data migration manager 500 may elect to maintain the user's save data for Game 1 in the first geo location and not migrate the relevant save data of the user for the game to the data center in the second geo location. If the probability of use for Game 1 is greater than the confidence threshold, the save data migration manager 500 may elect to migrate the user's relevant save data for the Game 1 to a data center in the second geo location, and such migration is done in anticipation that the user is more likely to select the game for game play at the second geo location. It should be noted that the probability of use takes into consideration time of day that the game is being played in order to determine the user's likely use of the game at the current geo location so that the relevant data is migrated only as and when it is needed. This allows the cloud gaming system 300 to preserve system processing, communication and network resources as the save data is not unnecessarily migrated when such save data is used minimally or not at all.

In one embodiment, the use pattern provided by the gameplay predictor module may indicate that the user accesses Game 1 every time he travels to a new location, irrespective of the usage trend defined by the user's game play in the first geo location. The save data migration manager 500 may use this information to issue a command to a server in the data center at the first geo location to migrate the relevant save data of Game 1 to the identified data center at the second geo location.

A save data identifier module 502 will identify the relevant save data for the user based on the use pattern of the user, and forward the relevant save data to the save data transmitter module 504. The save data identifier module 502 may use the information provided by the DC manager 400 to identify the relevant save data 508 for migrating to a second data center. In some embodiments, the save data identifier module 502 may identify the save data 508 in reverse chronological order from when the save data was last accessed by the user so that the save data that is most recent and, hence, most likely to be used is identified for migration. The reverse order migration of save data ensures that the save data 508 that is most likely to be used is migrated first. The save data transmitter module 504 identifies the relevant save data 508 and generates a signal for migrating the relevant save data 508. The signal from the save data transmitter module 504 is forwarded to the identified data center in the first geo location.

The data center in the first geo location receives the signal and, in response, establishes a communication connection with the identified data center in the second geo location, and migrates the relevant save data identified for the user to the data center in the second geo location, in accordance to the communication and network protocols used for transmitting the save data. The migrated save data is stored in the second geo location and made available to one or more games that the user is predicted to use in the second geo location. As part of the migration, an instance of the one or more games may also be pre-loaded to a game server or game console in the data center of the second geo location and game state updated from the migrated save data, in anticipation of the user's intended use. As a result, when a user accesses the game from the second geo location, a server in the data center at the second geo location provides instant game play access to the one or more games, and the user does not have to wait for the instance of the game to be loaded. Further, the migration of the save data based on intelligent prediction of likely use of the one or more games is transparent to the user as it allows the user to access a current state of the application from the second geo location while making the user believe that he is accessing the game data at the data center in the first geo location.

The migration of the relevant save data 508 is done without the user connecting to the game cloud system. The relevant save data 508 is moved in anticipation of use of such data by the user and the migration is done without requiring the user to login to the system. The migration is performed in advance and in anticipation that the user will login to the cloud gaming system and select the select ones of games for game play for which the save data was migrated. The data center at the second geo location to which the relevant save data 508 is to be migrated, is chosen such that it provides minimal latency and provides sufficient processing and communication resources so that the user will have satisfactory game play experience.

In some embodiments, the save data of the user that is analyzed and transmitted to a data center in the second geo location may include all save data collected over time for all games that the user played by accessing the cloud gaming system. This would allow a full catalog of all the games the user played using the cloud gaming system to be available at the second geo location. The save data collected over time is used to identify game play data for each game that the user accessed and played from the cloud gaming system, during each prior game play session. As a result, the usage trend of the user for different games may be determined by analyzing the game play data of the plurality of games collected from prior game play sessions of the user. In some embodiments, the save data of the user that is selected for transmitting may include all save data for select ones of the games collected over time, wherein the select ones of the games are identified from preceding pre-defined number of game play sessions. For example, if the pre-defined number is set at 10, then the save data of the preceding 10 game play sessions of the user is analyzed to determine which ones of the games that the user accessed for viewing or playing during the preceding 10 game play sessions. Based on the analysis, all save data for the select ones of the games are identified for transmission to a second data center in the second geo location. The pre-defined number of game play sessions may be defined at the system level or at a user level. In alternate embodiments, the save data of the user that is selected for transmitting may include a portion of save data for the select ones of the games that is collected over time. The save data identifier module 502 identifies the relevant save data for migrating to the data center in the second geo location and makes it available for user interaction.

In some embodiments, the client device 100 is used to detect the current geo location of the user and may be used for game play of select ones of the games from the second geo location. In alternate embodiments, the client device 100 may be used to detect the current geo location of the user. In this embodiment, access to the cloud gaming system and game play of a game may be initiated from a different client device associated with the user. For example, when a user moves from a first geo location (e.g., Boston, Mass.) to a second geo location (e.g., Austin, Tex.), the change in the geo location may be determined using signals generated from a user's mobile device (i.e., client device 100). The signals may be generated when the user interacts with certain ones of the client-side applications available on the user's mobile device or may be generated by a native application or tool available in the user's mobile device. Based on the signals, the relevant save data is moved from a data center in Boston to a data center in Austin, in anticipation that the user will select a game for game play from Austin. The user may indeed select to play the game while he is in Austin. Instead of using his mobile device, the user may however use a personal computer, a laptop computer, a tablet computer, a television monitor, a head mounted display or any other device and/or controls that is capable of accessing the game on the cloud gaming site, for playing the game. Irrespective of which device the user selects for playing a game at the second geo location, the advanced migration of the save data to the second geo location based on signals generated by the user's interactions at different applications on the network or client device, allows the user to resume his game play of the game from a point where he left off in his previous game play session. In some embodiments, a portion of the save data of the user that is relevant to playing select ones of the games is migrated to a data center in the second geo location. In one embodiment, the portion of the save data that is migrated includes all save data for the select ones of the games so that the system may be able to mimic a current state of the select ones of the games for game play by the user. In other embodiments, all save data of all the games that the user played may be migrated to the data center in the second geo location so that the user's game play environment at the data center in the first geo location may be mirrored in a data center in the second geo location.

User interaction during game play of a game, for example, is tracked and the game state of the game(s) is updated to the save data of the user maintained in the data center at the second geo location. Further, the updates to the current game state may also be transmitted to the data center in the first geo location so as to mirror the save data maintained for the game(s) at the second geo location. A save data update manager 506 is used to identify the save data updates and to generate a signal to the server at the second data center to forward the identified save data updates to the server at the data center at the first geo location. The server at the data center at the second geo location, in response to the signal provided by the save data update manager 506, establishes a communication connection or uses existing communication connection with the server at the data center in the first geo location and transmits the save data updates in accordance to communication, network and API protocols followed for communicating save data between the two data centers. Similarly, when the use returns to the first geo location and plays the games, the game play data is used to update current game state of the games at the first geo location. The game play data may also be transmitted to the data center in the second geo location to update the game state of the games at the second geo location, if the system detects that the user is accessing the cloud gaming system mostly from these two geo locations. The relevant save data of the user, in this case, is synchronized between the first and second geo locations. In some embodiments, the synchronization option may be used to maintain a copy of the relevant save data for the user in a second geo location so that it can be used as a fail-safe measure in the event that the user is unable to access the games from the first geo location. In such cases, the user may be redirected to the second geo location where the relevant save data of the user is readily available so that the user can access the game instantaneously.

When the user accesses his user account on the cloud gaming system from the second geo location for game play of a select game, the server in the data center at the second geo location establishes a direct communication connection between the client device and a game server or game console at the data center of the second geo location on which game code and game state of the select game has been loaded, allowing exchange of game play data between the game server or game console of the identified data center and the client device. During game play of the selected user, a quality-of-service (QoS) engine 350 available in the cloud gaming system may monitor the level of service provided by the assigned data center by testing the service quality provided by the data center to determine if the quality of service meets the required level of service expected for the user. In some embodiments, the quality of service testing may be performed at defined periods or may be performed continuously during the game play. In some embodiments, the quality of service required for the game play may be specified in the user account metrics of the user. Based on the quality testing, QoS engine 350 may send a signal to the data center manager within the cloud gaming system to either keep the data center assigned to service the request or switch it to a different data center within the second geo location. In some embodiments, the quality testing checks for connection speed, for optimal allocation of resources, level of service provided by each of the resources, etc., and such testing is performed with actual game data exchanged between the client device and the assigned data center in the second geo location from which the game data is being streamed to the client device.

Figure 3:
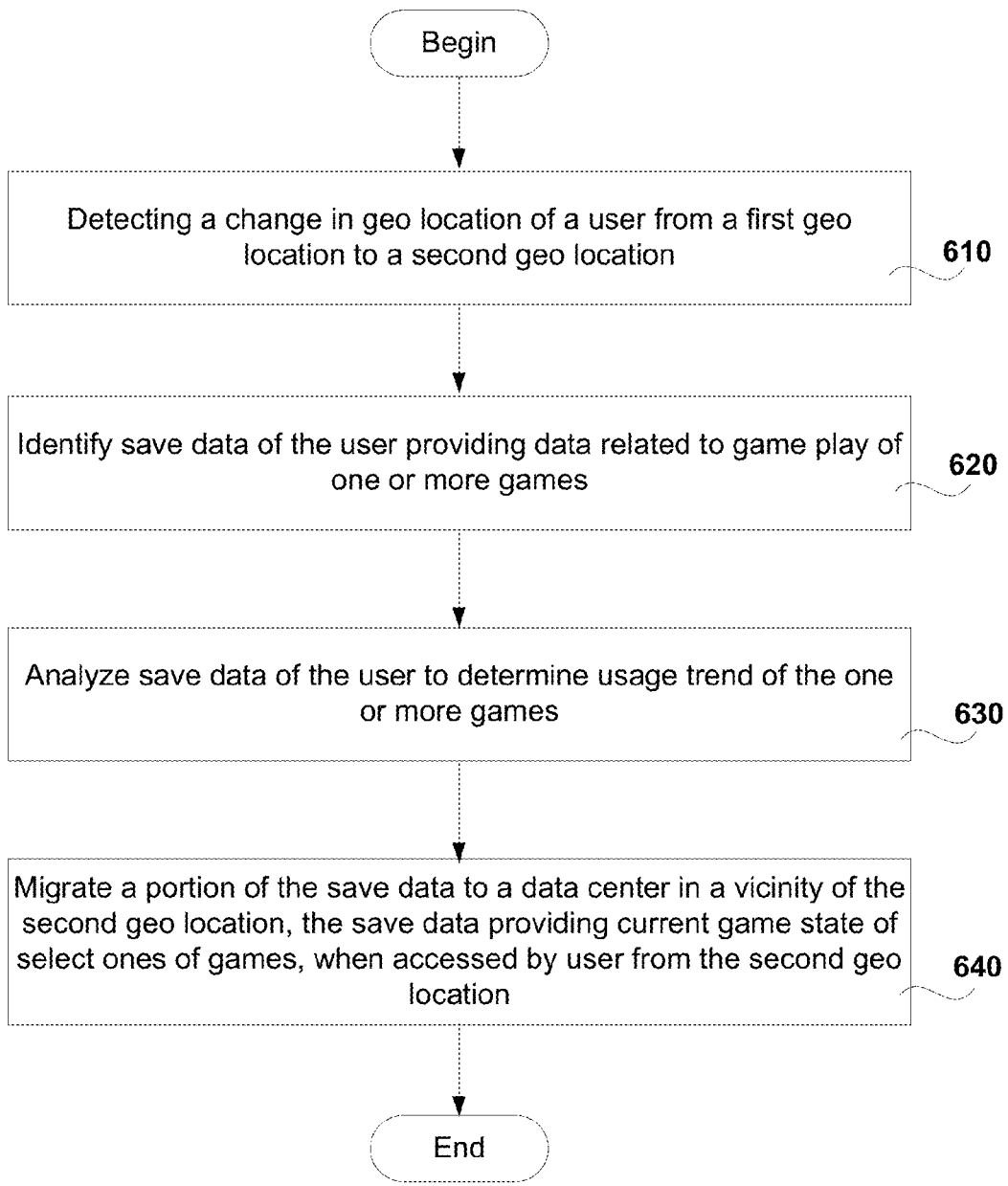
FIG. 3 illustrates the process operations involved in migrating save data to a data center at a different geo location from which a user accesses a game for game play, in accordance with an alternate embodiment of the invention.

FIG. 3 illustrates the various method operations used for detecting a change in geo location of a user from a first geo location to a second geo location and migrating save data of a user to a data center at the second geo location, in one embodiment of the invention. The save data is migrated in anticipation of servicing a game play request for one or more games related to the migrated save data from the user. The method begins at operation 610, wherein a change in geo location of a user from a first geo location to a second geo location is detected at a cloud gaming system. The change may be detected based on user interaction at a client device of the user or may be based on signal generated from the client device, such as signal generated from a global position system available within the client device. In response to detecting the change, the cloud gaming system identifies save data of the user corresponding to the user's game play of a one or more games at the cloud gaming site, as illustrated in operation 620. Every time the user accesses the cloud gaming system using his user account and plays a game, the cloud gaming site records the game play of the user and stores the game play as the user's save data. The save data is used by the cloud gaming system to provide current state of the one or more games to the user, so that the user can resume his game play of any one of the games from where he left off in his previous game play session.

The save data of the user is analyzed to determine usage trend of the user for the one or more games, as illustrated in operation 630. A user may play a plurality of games from the cloud gaming system and game play of each game in each game play session is recorded and maintained in the save data of the user. The save data provides a rich history of game play of the user that can be used to determine the user's game preferences, frequency of game play, time spent playing each game, user interactions with other users during game play, game winnings, game level, game customizations, and other user-related and game-related components that can be used to recreate the state of the game where the user left off.

A portion of the save data of the user corresponding to one or more games, is identified, based on the usage trend of the user and migrated to a second data center identified within a vicinity of the second geo location, as illustrated in operation 640. When the one or more games are selected by the user for game play by accessing the user's account on the cloud gaming system from the second geo location, the migrated portion of the save data is used to provide current game state for the one or more games to allow the user to resume his game play.

The various embodiments discussed herein provide ways to predict the user's preference to certain ones of the games on the cloud gaming system and, based on the prediction, move the user's save data to a data center in a vicinity of the current geo location of the user, before the user starts the next game play session for the certain ones of the games. Typically, based on the user's interest in game play, the user's save data that includes the game play of one or more games may be large. This save data, for performance reasons, should be stored and made readily available from within a data center at a particular geo location from which the user is accessing the cloud gaming system and playing the games. The user will usually play from one or two data centers that are in the vicinity of the particular geo location (e.g., home location). When a user travels to a second geo location and wants to play from the second geo location, the save data needs to be moved to a data center in the vicinity of the second geo location. Moving the save data at a time the user accesses the one or more games from his user account might take time, causing unnecessary wait time for the user. The current embodiments allow the cloud gaming system to use early notification (i.e., pre-gameplay) of the user's current geo location and drive the migration of the save data accordingly to a data center in a vicinity of the user's current geo location, when the current geo location is a new geo location. The geo location signal can come from a mobile device of the user, a user's browsing data, etc. The new geo location is transmitted to the cloud gaming system that streams the game play data to a user's client device for rendering on a display screen of the client device and the cloud gaming system uses the early notification of the new geo location to identify and migrate the relevant save data to a new data center in the vicinity of the new geo location. The system allows the save data to be migrated in reverse order from when it was last accessed, so that the save data that is most likely used by the user is available at the new geo location.

The current embodiments provide a streaming service worldwide by identifying and migrating save data of a user to a geographically close data center for the user's current geo location, so that the user can have satisfying game play experience with minimal latency. In one embodiment, both content and user-specific data are migrated to different data centers based on connection data, user locale, language, use history, etc. The current embodiments provide an adaptive data distribution technique based on the observed behavior of a user and connection patterns that was established to service prior requests of game play for the user. Other advantages of the current embodiments will become apparent for one skilled in the art.

Figure 4:
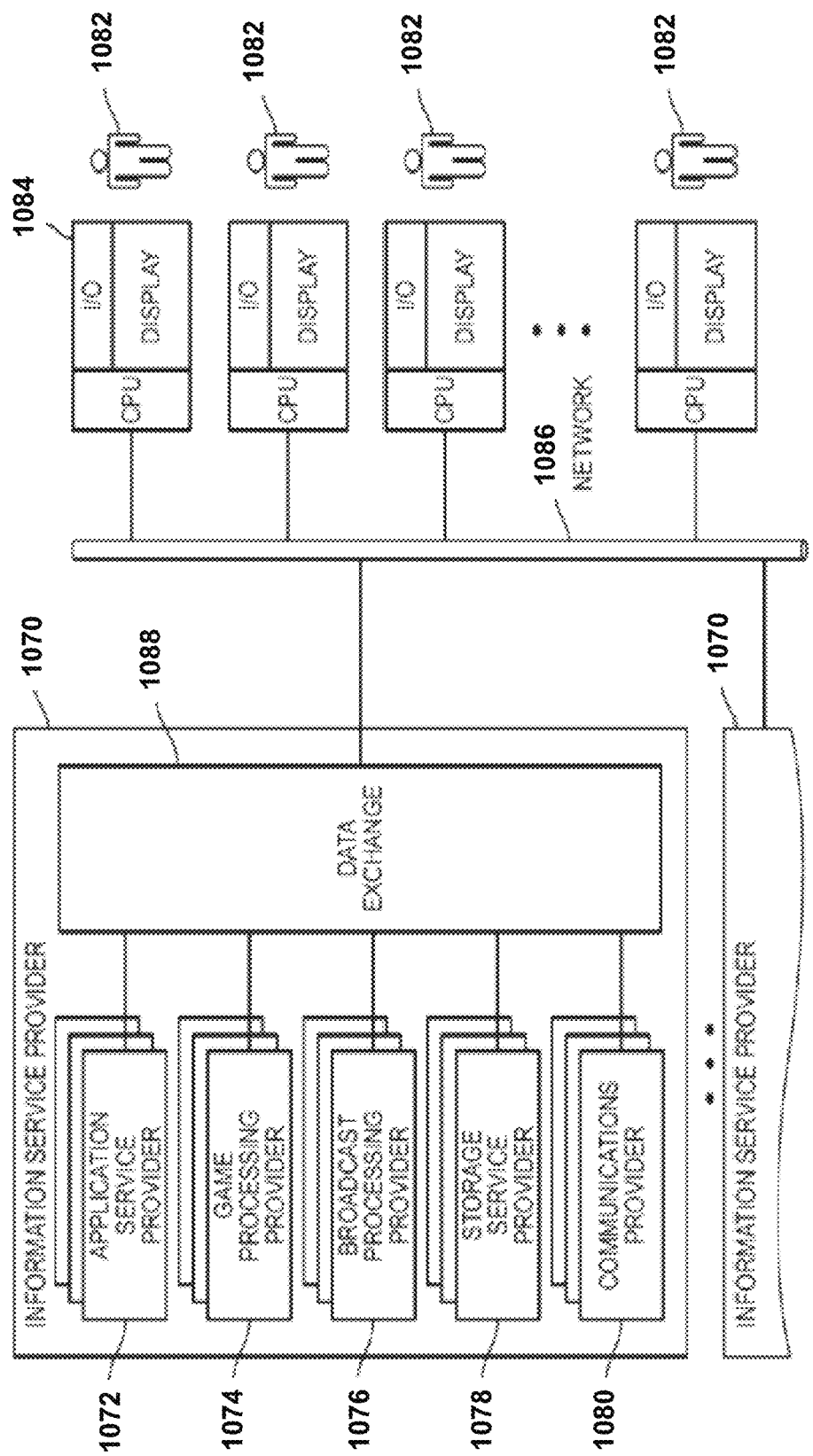
FIG. 4 illustrates an exemplary Information Service Provider architecture for delivering informational content and services to users who are geographically dispersed and connected via network, in accordance with one embodiment of the present invention.

FIG. 4 illustrates an embodiment of an Information Service Provider architecture that may be used in providing access to different games. Information Service Providers (ISP) 1070 deliver a multitude of information services to users 1082 geographically dispersed and connected via network 1086. Although the various embodiments have been discussed with reference to providing fast access to games, the embodiments can be extended to provide one or more types of other services. For example, an ISP can deliver just one type of service, such as a game, or a variety of services such as games, stock price updates, broadcast media, news, sports, gaming, etc. Additionally, the services offered by each ISP may be dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data from the user's gaming or access profile to the new ISP through the connection module, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP (i.e., during switching of data center assigned to the user) as the client moves around the world and such transfer may be based on a compatibility of services provided by the respective ISPs to make the ISP in better position to service the user be the one that delivers these services.

ISP 1070 includes Application Service Provider (ASP) 1072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on a vendor's system, for example, and is accessed by users through a web browser using HTML, or by a special purpose client software provided by the vendor, or via other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GaPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GaPS establishes communication between the players and their respective game-playing devices exchange information without relying on the centralized GaPS.

Dedicated GaPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as HTML, to access ISP 1070.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. Alternately, the computer readable code may be downloaded from a server using the data exchange interconnects described above. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

Figure 5:
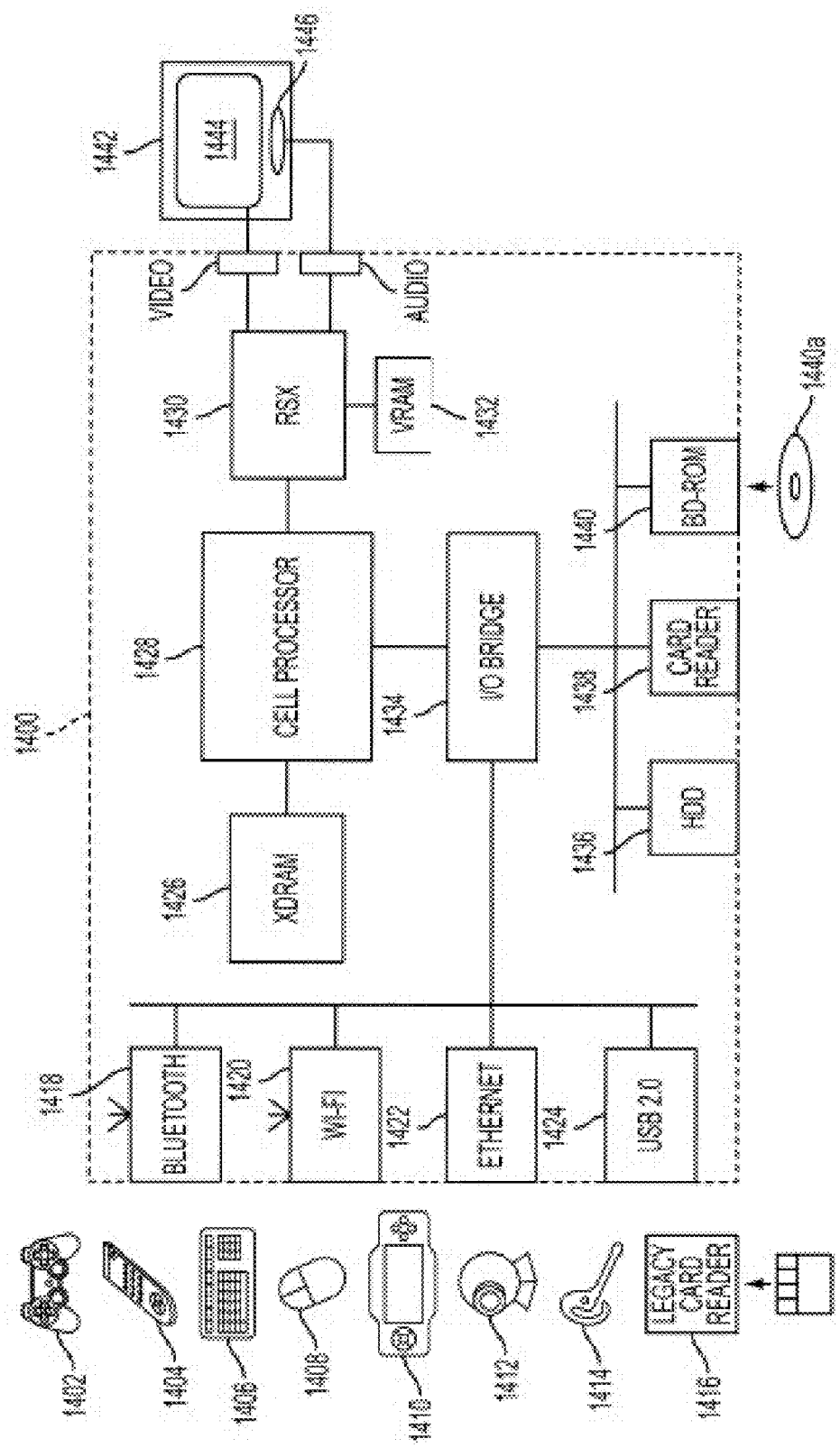
FIG. 5 schematically illustrates overall system architecture of a gaming console, in accordance with one embodiment of the present invention.

FIG. 5 schematically illustrates the overall system architecture of a gaming console, such as Sony® Playstation 3® entertainment device, that may be compatible with controllers for implementing an embodiment of the present invention. A system unit 1400 is provided, with various peripheral devices connectable to the system unit 1400. The system unit 1400 is similar to the cloud gaming system server 300 of FIG. 1. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation the I/O bridge 1434 handles all wireless, USB and Ethernet data, including data from one or more game controllers 1402. For example when a user is playing a game, the I/O bridge 1434 receives data from the game controller 1402 via a Bluetooth link and directs it to the Cell processor 1428, which updates the current state of the game accordingly.

The wireless, USB and Ethernet ports also provide connectivity for other peripheral devices in addition to game controllers 1402, such as: a remote control 1404; a keyboard 1406; a mouse 1408; a portable entertainment device 1410 such as a Sony Playstation Portable® entertainment device; a video camera such as an EyeToy® video camera 1412; and a microphone headset 1414. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards of the kind used by the Playstation® or Playstation 2® devices.

In the present embodiment, the game controller 1402 is operable to communicate wirelessly with the system unit 1400 via the Bluetooth link. However, the game controller 1402 can instead be connected to a USB port, thereby also providing power by which to charge the battery of the game controller 1402. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors may include conventional analogue and digital outputs whilst the video connectors may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

The Cell processor 1428 has an architecture comprising four basic components: external input and output structures comprising a memory controller and a dual bus interface controller; a main processor referred to as the Power Processing Element; eight co-processors referred to as Synergistic Processing Elements (SPEs); and a circular data bus connecting the above components referred to as the Element Interconnect Bus. The total floating point performance of the Cell processor is 218 GFLOPS, compared with the 6.2 GFLOPs of the Playstation 2 device's Emotion Engine.

The Power Processing Element (PPE) is based upon a two-way simultaneous multithreading Power compliant PowerPC core (PPU) running with an internal clock of 3.2 GHz. It comprises a 512 kB level 2 (L2) cache and a 32 kB level 1 (L1) cache. The PPE is capable of eight single position operations per clock cycle, translating to 25.6 GFLOPs at 3.2 GHz. The primary role of the PPE is to act as a controller for the Synergistic Processing Elements, which handle most of the computational workload. In operation the PPE maintains a job queue, scheduling jobs for the Synergistic Processing Elements and monitoring their progress. Consequently each Synergistic Processing Element runs a kernel whose role is to fetch a job, execute it and synchronized with the PPE.

Each Synergistic Processing Element (SPE) comprises a respective Synergistic Processing Unit (SPU), and a respective Memory Flow Controller (MFC) comprising in turn a respective Dynamic Memory Access Controller (DMAC), a respective Memory Management Unit (MMU) and a bus interface (not shown). Each SPU is a RISC processor clocked at 3.2 GHz and comprising 256 kB local RAM, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU does not directly access the system memory XDRAM 1426; the 64-bit addresses formed by the SPU are passed to the MFC which instructs its DMA controller to access memory via the Element Interconnect Bus and the memory controller.

The Element Interconnect Bus (EIB) is a logically circular communication bus internal to the Cell processor 1428 which connects the above processor elements, namely the PPE, the memory controller, the dual bus interface and the 8 SPEs, totaling 12 participants. Participants can simultaneously read and write to the bus at a rate of 8 bytes per clock cycle. As noted previously, each SPE comprises a DMAC for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller comprises an XDRAM interface, developed by Rambus Incorporated. The memory controller interfaces with the Rambus XDRAM 1426 with a theoretical peak bandwidth of 25.6 GB/s.

The dual bus interface comprises a Rambus FlexIO® system interface. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge via controller and the Reality Simulator graphics unit 200 via controller.

Data sent by the Cell processor 1428 to the Reality Simulator graphics unit 1430 will typically comprise display lists, being a sequence of commands to draw vertices, apply textures to polygons, specify lighting conditions, and so on.

Embodiments may include capturing depth data to better identify the real-world user and to direct activity of an avatar or scene. The object can be something the person is holding or can also be the person's hand. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth Xcamera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
   determining a change in geo location of a user from a first geo location to a second geo location;
   identifying save data of the user stored in a first data center corresponding to the first geo location, wherein the save data includes data related to game play of one or more games by the user collected over time;
   analyzing the save data of the user to determine usage trend related to the game play of one or more games by the user, the usage trend determined from game metrics captured in the save data during game play of the one or more games;
   determining a portion of save data that is to be made available to the user for subsequent game play of select ones of the games by the user, based on the usage trend; and
   transmitting the portion of save data to a second data center corresponding to the second geo location prior to the user accessing the one or more games from the second geo location, the transmitting is performed in anticipation of likely access of the save data by the user at the second geo location, based on the usage trend of the user,
   wherein the portion of save data is made available to game logic of the select ones of the games executing at the second data center within the second geo location, the save data used to provide a current state of game play of the select ones of the games for the user accessing a cloud gaming system via a user account.

2. The method of claim 1, wherein the change in the geo location is determined through one of a signal obtained from a global positioning system available within a client device of the user, web browsing data of the user, social media posts, information obtained from user interactions at an application within the client device, or any combinations thereof.

3. The method of claim 1, wherein the first data center and the second data center are determined based on any one of connection requirements expected for servicing game play requests from the user, connection resource availability, system resource availability, game availability, resource demands, or any combinations thereof.

4. The method of claim 1, wherein the analyzing further includes,
   determining a relative weight for each type of user metrics captured during game play of the one or more games;
   indexing the save data of the user based on the relative weight accorded to each type of user metrics identified from game play, the indexing of the save data augmented as additional save data is received based on continual engagement of the user in game play of the one or more games; and
   prioritizing the save data in accordance to the index to reflect the usage trend of the user toward the one or more games.

5. The method of claim 1, wherein determining the portion of save data includes, identifying game type associated with the select ones of the games; and assessing current and past activities of the user related to the game play of the select ones of the games selected by the user, wherein the game type and the assessment of the activities of the user registered for the select ones of the games are used in identifying the portion of save data of the user for transmission to the second data center.

6. The method of claim 5, wherein the assessment includes identifying the activities of the user for the select ones of the games in reverse chronological order and the save data being transmitted to the second data center is in accordance to the assessment of the activities.

7. The method of claim 1, further includes transmitting the save data for the select ones of the games from the second data center to the first data center, the transmitting causes automatic updating of the save data in the first data center at the first geo location, the updates to the save data being available to the user during game play of the select ones of the games at the first geo location.

8. The method of claim 7, wherein the transmitting is done in response to detection of any one of a conclusion of the game play of the select ones of the games by the user at the second geo location, a conclusion of game play session of the user at the second geo location, or a change in the geo location of the user from the second geo location to the first geo location.

9. The method of claim 1, wherein the portion of save data includes all save data for the select ones of the games to enable mirroring the current state of game play of the user for the select ones of the games.

10. The method of claim 1, wherein anticipation of likely access of a game is determined by, computing a probability of use of the game by analyzing the usage trend of the user; and determining the likely access of the game when the probability of use computed for the game for the user exceeds a pre-defined confidence threshold.

11. A cloud gaming system, comprising:

an application server within the cloud gaming system configured to service requests to access a plurality of games for user interaction, the requests received from a user account of a user, the application server of the cloud gaming system including, a data center manager configured to, determine a change in geo location of the user from a first geo location to a second geo location;

analyze use history of the user for the plurality of games to determine usage trend of the user in relation to the plurality of games;

identify a new data center in a vicinity of the second geo location, the new data center identified based on the usage trend; and a save data migration manager configured to, determine a portion of save data of the user related to select ones of the plurality of games, based on usage trend of the user;

generate a signal to a data center in the first geo location to migrate the portion of the save data of the user to the new data center, prior to receiving access request from a user account of the user at the second geo location, the signal generated in anticipation of likely access of the portion of the save data by the user from the second geo location as defined by the usage trend of the user, wherein the portion of the save data is made available to the select ones of the plurality of games in order to provide current game state, wherein the cloud gaming system is defined by a plurality of game servers within a plurality of data centers that are accessible over a network to client devices of users that are registered with the cloud gaming system, wherein a game server at the new data center is configured to perform pre-loading of the select ones of the plurality of games in preparation of making instances of the select ones of the plurality of games available for instant game play, wherein the game server at the new data center, in response to receiving selection of game play of a game from the select ones of the plurality of games from one of the client devices, compresses a stream of video frames generated for the game using an encoder, and forwards encoded video frames to the client device, the client device is configured to use a decoder to decompress the encoded video frames and render images on a display screen of the client device, and to supply input to the game server to drive interactivity of the game, wherein the compressing enables the video frames of the game play to be streamed to the client device with reduced latency.

12. The cloud gaming system of claim 11, wherein the application server is configured to receive geo location data from the client device and verify to determine the change in the geo location of the user.

13. The cloud gaming system of claim 11, wherein the application server includes one or more social media application programming interface (API) to make API calls to one or more social media system and obtain information from social media feed of the user, the application server is configured to contextually analyze the information from social media feed to obtain geo location data and verify the geo location data to determine the change in the geo location of the user.

14. The cloud gaming system of claim 11, wherein the portion of the save data is determined based on game type of the select ones of the plurality of games or the usage trend of the user.

15. The cloud gaming system of claim 11, wherein the save data migration manager is further configured to, detect changes to the save data resulting from game play of the select ones of the plurality of games at the new data center in the second geo location; and generate a signal to the particular game server in the new data center at the second geo location to transmit the changes to a server in the data center in the first geo location for updating the save data of the user, the updating provides current state of the select ones of plurality of games for the user at the first geo location.

16. The cloud gaming system of claim 11, wherein the cloud gaming system further includes a quality of service engine that is configured to verify connection attributes of a communication connection between the client device and the new data center in the second geo location after assigning the new data center to service the request of the user, and to generate a switch signal to the data center manager to switch the new data center, when the connection attributes of the communication connection does not meet connection requirements for servicing user interaction requests from the user for the select ones of the plurality of games.

17. The cloud gaming system of claim 11, wherein the data center manager includes a geo tag storage to store geo tag data received from client devices associated with one or more users, the geo tag data used to update geo tag history for each of the one or more users.

18. A client device, comprising:
a processor for executing one or more client-side applications, wherein the client-side applications are configured to interact over a network with corresponding server-side applications hosted by one or more servers of application hosting systems, the client-side applications used to provide user interactions for updating the server-side applications;
a client-side processing module configured to interact with a cloud gaming system, the client-side processing module is configured to,
collect geo location information from user interactions at one or more of the client-side applications;
interpret the geo location information to generate geo tags;
automatically transmit the geo tags to an application server of the cloud gaming system when the geo tags indicate a change in geo location of a user from a first geo location to a second geo location, wherein the change in the geo location of the user triggering the application server to determine usage trend of the user in relation to game play of one or more games hosted by the cloud gaming system, identify a portion of save data corresponding to select ones of games, and generate a signal to migrate the portion of save data for the user corresponding to select ones of games from a first data center in the first geo location to a second data center in the second geo location, the signal for migrating performed prior to the user selecting the one or more games from the second geo location; and
receive save data for select ones of the games compressed, formatted and streamed from a game server at the second data center, in response to detecting selection of the select ones of the games by the user at the client device, the save data received is decompressed and rendered on a display screen of the client device, the save data providing current state of the select ones of the games.

19. The client device of claim 18, wherein the geo location information is collected periodically from user interactions at the client device and used to perform verification of a current geo location information of the user.

20. The client device of claim 18, wherein the client-side processing module includes a threshold analysis module that is configured to perform predefined number of verifications to confirm change in the geo location of the user from the first geo location to the second geo location prior to transmitting the geo tags to the application server, wherein the verifications are performed by,
analyzing user interactions with additional one or more of the client-side applications to identify geo location information; and
verifying the geo location information gathered from the user interactions at additional one or more of the client-side applications, to determine if the geo location information corresponds to the second geo location.

21. The client device of claim 18, wherein the geo tags are provided as coordinates.

22. A method, comprising:
determining a change in geo location of a user from a first geo location to a second geo location;
identifying save data of the user stored in a first data center corresponding to the first geo location, wherein the save data includes data related to game play of games by the user that is collected over time;
analyzing the save data of the user to determine usage trend related to the game play of the games by the user, the usage trend determined from game metrics captured in the save data during game play of the games; and
transmitting the save data of the user to a second data center corresponding to the second geo location prior to the user accessing one or more of the games from the second geo location, the transmitting is performed in anticipation of likely access of the save data by the user at the second geo location, based on the usage trend of the user,
wherein the save data is made available to game logic of the games executing at the second data center within the second geo location of a cloud gaming system, the save data used to provide a current state of game play of the games for the user accessing the cloud gaming system via a user account.

23. The method of claim 22, wherein analyzing the save data includes,
assessing current and past activities of the user related to the game play of the games selected by the user using the game metrics captured in the save data, the assessment includes identifying the activities of the user for the select ones of the games in reverse chronological order, the assessment used in determining order of transmission of save data to the second data center.

24. The method of claim 22, wherein transmitting the save data includes transmitting all save data of the user for all games the user accessed or played using the user account.

25. The method of claim 22, wherein transmitting the save data includes transmitting all save data of the user for select ones of the games, wherein select ones of the games are identified from usage trend of the user.

26. The method of claim 25, wherein the usage trend identifies one or more games that were played during each prior game play session of the user.

27. The method of claim 26, wherein the select ones of the games are identified from preceding pre-defined number of game play sessions.

28. The method of claim 22, wherein transmitting the save data includes transmitting a portion of save data of the user from select ones of the games.

29. The method of claim 22, wherein transmitting the save data includes transmitting a portion of save data of the user from all the games that the user interacted over time.

* * * * *